(12) United States Patent
Park

(10) Patent No.: US 11,537,137 B2
(45) Date of Patent: Dec. 27, 2022

(54) MARKER FOR SPACE RECOGNITION, METHOD OF MOVING AND LINING UP ROBOT BASED ON SPACE RECOGNITION AND ROBOT OF IMPLEMENTING THEREOF

(71) Applicant: LG ELECTRONICS INC., Seoul (KR)

(72) Inventor: Hyeri Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 537 days.

(21) Appl. No.: 16/490,006

(22) PCT Filed: Jun. 18, 2019

(86) PCT No.: PCT/KR2019/007359
§ 371 (c)(1),
(2) Date: Aug. 29, 2019

(87) PCT Pub. No.: WO2020/256179
PCT Pub. Date: Dec. 24, 2020

(65) Prior Publication Data
US 2021/0382494 A1     Dec. 9, 2021

(51) Int. Cl.
*G05D 1/02*     (2020.01)

(52) U.S. Cl.
CPC ......... *G05D 1/0234* (2013.01); *G05D 1/0223* (2013.01); *G05D 1/0238* (2013.01); *G05D 1/0246* (2013.01); *G05D 2201/0216* (2013.01)

(58) Field of Classification Search
CPC .. G05D 1/0234; G05D 1/0223; G05D 1/0238; G05D 1/0246; G05D 2201/0216
See application file for complete search history.

(56) References Cited

U.S. PATENT DOCUMENTS

| | | | | |
|---|---|---|---|---|
| 9,204,594 B2 * | 12/2015 | Hwang | ................ | A01D 34/008 |
| 10,029,368 B2 * | 7/2018 | Wolowelsky | ........ | G05D 1/0246 |
| 10,592,916 B1 * | 3/2020 | DeLorean | .............. | G08G 1/052 |
| 2004/0202351 A1 * | 10/2004 | Park | ..................... | G05D 1/0234 |
| | | | | 382/104 |

(Continued)

FOREIGN PATENT DOCUMENTS

| JP | 2006-146491 A | 6/2006 |
|---|---|---|
| JP | 2006338580 A | * 12/2006 |

(Continued)

OTHER PUBLICATIONS

Machine translation of Ra, KR20180109107A (Year: 2018).*

*Primary Examiner* — Ryan Rink
(74) *Attorney, Agent, or Firm* — Birch, Stewart, Kolasch & Birch, LLP

(57) ABSTRACT

Provided are a marker for space recognition, a method of moving and lining up a robot based on space recognition, and a robot, and the robot that lines up and moves based on space recognition includes: a camera sensor that images a marker disposed on a traveling floor of the robot or a side of the traveling floor; and a control unit that analyzes an image captured by the camera sensor, calculates a moving direction or a moving speed of the robot on the basis of the marker, and controls a movement unit.

17 Claims, 15 Drawing Sheets

(56) References Cited

U.S. PATENT DOCUMENTS

| | | | | |
|---|---|---|---|---|
| 2006/0106496 | A1* | 5/2006 | Okamoto | G05D 1/0278 |
| | | | | 700/253 |
| 2011/0043378 | A1* | 2/2011 | Bailey | G08G 1/081 |
| | | | | 340/917 |
| 2014/0070963 | A1* | 3/2014 | DeLorean | G09F 21/04 |
| | | | | 340/917 |
| 2016/0121487 | A1* | 5/2016 | Mohan | B25J 13/085 |
| | | | | 700/250 |
| 2016/0363930 | A1* | 12/2016 | Kwak | A47L 9/2857 |
| 2019/0049549 | A1* | 2/2019 | Tang | G01S 5/0257 |
| 2019/0155295 | A1* | 5/2019 | Moore | G05D 1/0225 |
| 2019/0202057 | A1* | 7/2019 | Smith | G06K 19/06131 |
| 2019/0265721 | A1* | 8/2019 | Troy | G06T 7/254 |
| 2019/0287063 | A1* | 9/2019 | Skaaksrud | G05D 1/0223 |
| 2019/0367012 | A1* | 12/2019 | Matta | B60W 30/06 |
| 2020/0101619 | A1* | 4/2020 | Liu | B25J 9/1697 |
| 2020/0150655 | A1* | 5/2020 | Artes | G05D 1/0016 |
| 2020/0174484 | A1* | 6/2020 | Eoh | G05D 1/024 |
| 2021/0064151 | A1* | 3/2021 | Kok | G06T 7/11 |
| 2021/0089045 | A1* | 3/2021 | Kitano | G05D 1/0234 |
| 2021/0405646 | A1* | 12/2021 | Park | G05D 1/0234 |
| 2022/0066456 | A1* | 3/2022 | Ebrahimi Afrouzi | A47L 9/30 |

FOREIGN PATENT DOCUMENTS

| | | | |
|---|---|---|---|
| KR | 10-2011-0121863 A | | 11/2011 |
| KR | 101872282 B1 | * | 6/2018 |
| KR | 10-2018-0109107 A | | 10/2018 |
| KR | 10-2018-0109125 A | | 10/2018 |
| KR | 10-2019-0019390 A | | 2/2019 |

\* cited by examiner

MARKER FOR SPACE RECOGNITION, METHOD OF MOVING AND LINING UP ROBOT BASED ON SPACE RECOGNITION AND ROBOT OF IMPLEMENTING THEREOF

CROSS REFERENCE TO RELATED APPLICATIONS

This application is the National Phase of PCT International Application No. PCT/KR2019/007359, filed on Jun. 18, 2019, which is hereby expressly incorporated by reference into the present application.

TECHNICAL FIELD

The invention relates to a marker for space recognition, a method of moving and lining up a robot based on space recognition, and a robot for implementing the method.

BACKGROUND ART

In spaces in which human resources and material resources are actively exchanged such as large-scale marts, department stores, airports, and golf courses, various persons move with various objects carried. In this case, devices such as carts can assist users to move objects.

Conventionally, users handled and moved carts directly. However, when a user checks various articles and performs payment, a user's cart may hinder passage of another cart. In this situation, time and labor are required for a user to continuously care for a cart.

In order for a user to move freely and to do various activities, there is demand for autonomous traveling of a cart based on spatial characteristics without requiring a user's particular control of the cart or movement of the cart using electrical energy under the control of a user.

Particularly, a cart-robot needs to recognize a space in which there are predetermined constraints in movement of carts such as a checkout counter and operate to cope therewith.

DISCLOSURE

Technical Problem

The invention was made in consideration of the above-mentioned circumstances and provides a mechanism that can allow a cart-robot to recognize a special space and to move autonomously in the special space.

The invention also provides a technique of allowing a cart-robot to recognize markers, which can be recognized by the cart-robot and which are disposed in a special space, and to line up.

The invention also provides a technique of allowing a cart-robot to acquire information from visual characteristics of markers and to change a moving speed or to control a moving direction.

The invention is not limited to the above-mentioned objectives, and other objectives and advantages of the invention which are not mentioned above can be understood from the following description and can be more apparently understood from embodiments of the invention. It can be easily understood that objectives and advantages of the invention will be able to be embodied by means described in the appended claims and combinations thereof.

Technical Solution

According to an embodiment of the invention, there is provided a cart-robot that lines up and moves based on space recognition, including: a camera sensor that images a marker disposed on a traveling floor of the cart-robot or a side of the traveling floor; and a control unit that analyzes an image captured by the camera sensor, calculates a moving direction or a moving speed of the cart-robot on the basis of the marker, and controls a movement unit.

The cart-robot that lines up and moves based on space recognition according to an embodiment of the invention may further include a control unit that calculates the moving speed or the moving direction in a space in which the marker is disposed using one of a color, a shape, and a flickering pattern of the marker.

A marker for space recognition according to an embodiment of the invention includes: a light source that emits light; a communication unit that receives a control message for controlling an operation of the marker from a server or a marker control module; and a marker control unit that controls emission of light from the light source according to the control message.

A method of moving and lining up based on space recognition according to an embodiment of the invention includes: causing a movement unit of a cart-robot to move the cart-robot; causing a camera sensor to image a marker which is disposed on a traveling floor of the cart-robot or a side of the traveling floor while moving; analyzing an image captured by the camera sensor and identifying the marker; causing a control unit of the cart-robot to calculate a moving direction or a moving speed of the cart-robot on the basis of the identified marker; and causing the control unit to control the movement unit using one or more of the calculated moving direction and the calculated moving speed.

Advantageous Effects

According to the embodiments of the invention, a cart-robot can move by autonomous traveling in a special space such as a checkout counter or a moving walk.

According to the embodiments of the invention, a cart-robot can ascertain a special space using a camera sensor and adjust a traveling speed or a traveling direction suitable for the special space.

According to the embodiments of the invention, a cart-robot can move under the control of a user and move autonomously in a space requiring limited movement patterns such as a moving walk or a checkout counter to enhance convenience for a user.

Advantageous effects of the invention are not limited to the above description and those skilled in the art can easily derive various advantageous effects of the invention from the configurations of the invention.

DETAILED DESCRIPTION

Figure 1:
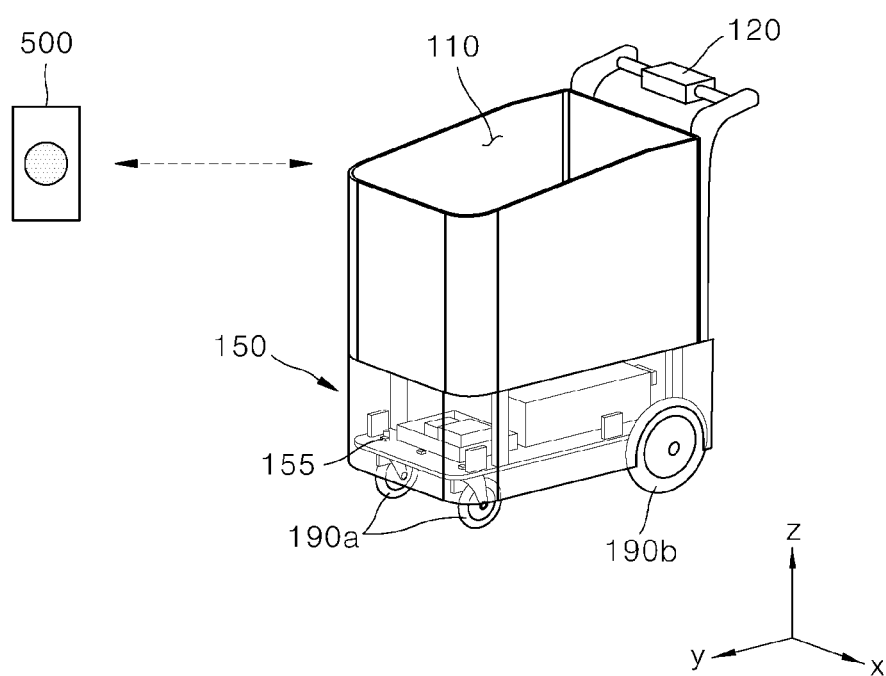
FIG. 1 is a diagram illustrating appearance of a cart-robot according to an embodiment of the invention.

Hereinafter, embodiments of the invention will be described in detail with reference to the accompanying drawings such that the invention can be easily implemented by those skilled in the art. The invention can be embodied in various forms and is not limited to the embodiments.

Parts which are not associated with description will be omitted in order to clearly describe the invention, and the same or similar elements over the entire specification will be referred to by the same reference signs. Some embodiments of the invention will be described in detail with reference to the accompanying drawings. In the drawings, the same elements will be referred to by as the same reference signs as possible. In the following description, when detailed description of the relevant known configurations or functions is determined to obscure the important point of the present disclosure, the detailed description will be omitted.

Terms such as first, second, A, B, (a), and (b) can be used to describe elements of the invention. These terms are merely used to distinguish one element from another element and the essence, order, sequence, number, or the like of the elements is not limited to the terms. If it is mentioned that an element is "coupled" or "connected" to another element, it should be understood that the element is directly coupled or connected to another element or still another element may "interposed" therebetween or the elements may be "coupled" or "connected" to each other with still another element interposed therebetween.

In embodying the invention, elements can be segmented and described for the purpose of convenience of explanation, these elements may be embodied in one device or module, or one element or may be divided and embodied into two or more devices or modules.

In the following description, devices that move autonomously to track users or move with electric energy under the control of users are referred to as smart cart-robots, cart-robots, robots, or carts. Cart-robots can be used in shops such as large-scale marts or department stores. Alternatively, cart-robots can be used by users in spaces in which many trippers move such as airports or harbors. Cart-robots can also be used in leisure spaces such as golf courses.

The cart-robots include all devices that track a position of a user, follow the user, and has a predetermined storage space. The cart-robots include all devices that move using electric power under the control of a user such as pushing and pulling. As a result, a user can move a cart-robot without requiring adjustment of the cart-robot. A user can move the cart-robot with a very small force.

Figure 2:
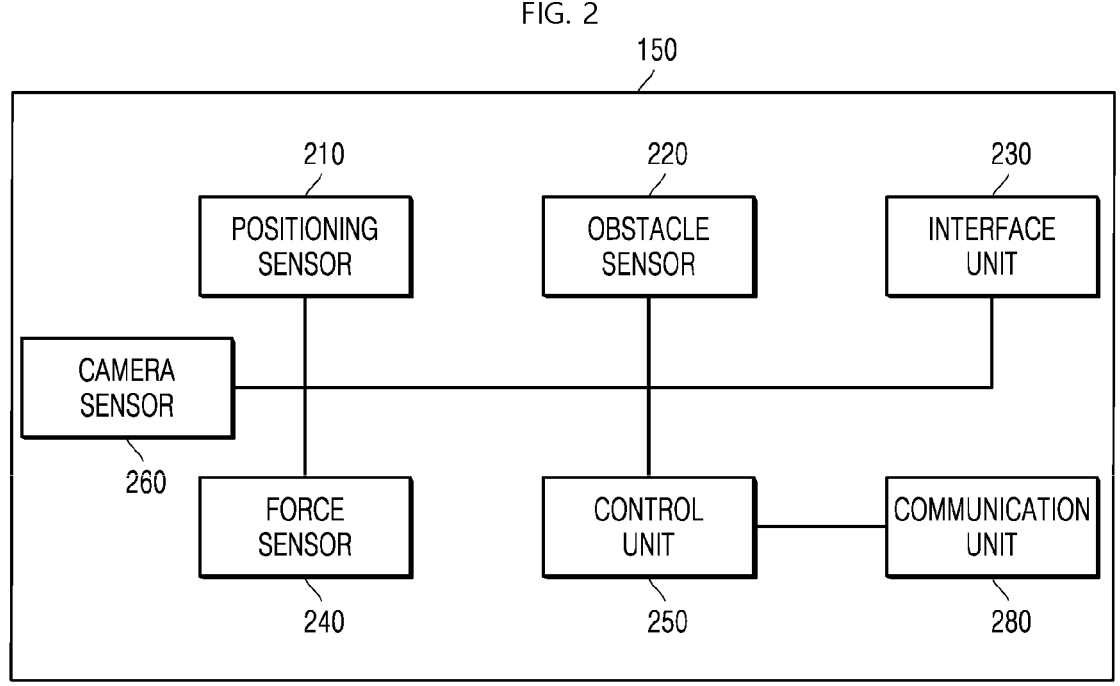
FIG. 2 is a block diagram illustrating elements of a control module of a cart-robot according to an embodiment of the invention.

FIG. 1 is a diagram illustrating appearance of a cart-robot according to an embodiment of the invention. FIG. 2 is a block diagram illustrating elements of a control module 120 of a cart-robot according to an embodiment of the invention.

A cart-robot 100 includes a storage unit 110, a handle assembly 120, a control module 150, and movement units 190a and 190b. The storage unit 110 is a space in which articles are stored or piled by a user. The handle assembly 120 enables a user to manually control movement of the cart-robot 100 or to semi-automatically control movement of the cart-robot 100.

A user can presses the cart-robot 100 forward and backward or change a direction thereof using the handle assembly 120. In this case, the cart-robot 100 can travel semi-automatically using electric energy according to the magnitude of a force applied to the handle assembly 120 or a difference between right and left of the force.

The control module 150 controls movement of the cart-robot 100. Particularly, the control module 150 controls autonomous traveling of the cart-robot 100 to follow a user. The control module 150 controls semi-autonomous traveling (power assist) in which the cart-robot travels by assisting a user's force when the user pushes or pulls the cart-robot with a small force.

The control module 150 controls the movement unit 190. The movement unit 190 moves the cart-robot along a moving route which his generated by a control unit 250. The movement unit 190 can move the cart-robot by rotating wheels of the movement unit 190. In movement of the cart-robot by the movement unit 190, the control unit 250 can ascertain the position of the cart-robot 100 on the basis of the rotation speed, the number of rotations, and the direction of the wheels. The moving route which is generated by the control unit 250 includes angular velocities which are applied to the right wheel and the left wheel of the cart-robot.

Positioning sensor that tracks a position of a user to follow the user are disposed in various positions of the cart-robot 100. Obstacle sensors that sense a nearby obstacle are disposed at various positions of the cart-robot 100. Each positioning sensor senses a transmitter module 500 that outputs a specific signal.

Description will continue to be made with reference to FIG. 2.

FIG. 2 is a diagram illustrating a positioning sensor 210, a force sensor 240, an obstacle sensor 220, an interface unit 230, a control unit 250, a camera sensor 260, and a communication unit 280 which are logical elements of the control module 150.

The obstacle sensor 220 senses an obstacle near the cart-robot. The obstacle sensor 220 can sense a distance between the cart-robot and a person, a wall, an object, a fixed object, an installed object, or the like.

The positioning sensor 210 is an essential element of the cart-robot that supports autonomous traveling. However, in a cart-robot that supports only semi-autonomous traveling (power assist), the positioning sensor 210 can be selectively disposed.

The positioning sensor 210 tracks a position of a user who carries a transmitter module 500 and is disposed on an upper side, a lateral side, or the like of the cart-robot 100. However, the positions of these sensors can change and the invention is not limited thereto. Regardless of the positions of the sensors, the control unit 150 controls the sensors or uses information sensed by the sensors. That is, the sensors are logical elements of the control module 150 regardless of the physical positions thereof.

The positioning sensor 210 receives a signal from the transmitter module 500 and measures the position of the transmitter module 500. When the positioning sensor 210 uses the ultra-wideband (UWB), a user can carry a transmitter module 500 that transmits a predetermined signal to the positioning sensor 210. The positioning sensor 210 can ascertain the position of the user on the basis of the position of the transmitter module 500. For example, the user may carry a transmitter module 50 of a band type which is worn on the users wrist.

An interface unit that outputs predetermined information to a user is disposed in the handle assembly 120, and the interface unit is an element which is controlled by the control module 150. The handle assembly 120 includes the force sensor 240 that senses a force with which a user pushes or pulls the cart-robot.

The force sensor 240 is disposed inside or outside the cart-robot 100 which is subjected to change of a force by operation of the handle assembly 120. The position or configuration of the force sensor 240 is not particularly limited, and the invention is not limited to any specific force sensor 240.

The force sensor 240 is disposed in the handle assembly 120 or is disposed inside or outside the cart-robot 100 which is connected to the handle assembly 120. When a user applies a force to the handle assembly 120, the force sensor 240 senses the magnitude of a force, change of a force, or the like. The force sensor 240 includes various sensors such as a Hall sensor, a magnetic type sensor, and a button type sensor. The force sensor 240 can be disposed as a right force sensor and a left force sensor in the handle assembly 120 or inside or the outside the cart-robot 100.

The obstacle sensor 220 senses an obstacle near the cart-robot. The obstacle sensor includes a sensor that measures a distance or acquires an image and ascertains an obstacle in the image. Exemplary embodiment of the obstacle sensor 220 that measures a distance includes an infrared sensor, an ultrasonic sensor, and a LIDAR sensor.

The obstacle sensor 220 includes a depth sensor or an RGB sensor. The RGB sensor can sense an obstacle and an installed object in an image. The depth sensor can calculates depth information for each position in an image.

The obstacle sensor 220 includes a time-of-flight (TOF) sensor.

The control unit 250 cumulatively stores position information of a transmitter module and generates a moving route corresponding to the store deposition information of the transmitter module. In order to cumulatively store the position information, the control unit 250 can store the position information as absolute position information (absolute coordinates) based on a predetermined reference point.

Alternatively, the control unit 250 may control movement of the cart-robot using the obstacle sensor 220 and the camera sensor 260. Particularly, the control unit 250 analyzes an image captured by the camera sensor 260, calculates a moving direction or a moving speed of the cart-robot 100 on the basis of markers, and controls the movement unit 190.

The control unit 250 controls the moving direction of the moving speed of the movement unit according to the change or magnitude of a force sensed by the force sensor 240. Alternatively, the control unit 250 can control the movement unit 190 such that more electric energy is supplied to a motor of the movement unit to control the moving speed.

The control unit 250 detects an installed object near the cart-robot using a value sensed by the obstacle sensor 220. The control unit 250 can ascertain an installed object using the obstacle sensor 220 disposed on a lateral side and a front side of the cart-robot.

The camera sensor 260 can capture an image of an object, a person, an installed object, and the like near the cart-robot. Particularly, the camera sensor 260 can image markers disposed on a bottom surface of a space in which the cart-robot 100 travels, that is, on the traveling floor. The camera sensor 260 can image markers disposed on a lateral side of the traveling floor. The camera sensor 260 is disposed on a lower side, a lateral side, a front side, or the like of the cart-robot 100.

For example, the camera sensor 260 can image markers on the ceiling. In this case, the camera sensor 260 is disposed in the handle assembly, the storage unit 110, or the like.

That is, the obstacle sensor 220 or the camera sensor 260 is disposed at various positions such as a lower end, a middle side, and a lateral side of the cart-robot 100 and can sense or image objects in various directions.

For example, a plurality of sensors 220 may be disposed in a part denoted by reference numeral 155 to sense an obstacle on front/rear/right/left sides from the cart-robot. The obstacle sensors 220 are disposed at the same height position in the lower part of the cart-robot 100. Alternatively, the obstacle sensors 220 may be disposed at two or more different height positions in the lower part of the cart-robot 100. The obstacle sensors may be disposed on the front side and both lateral sides thereof in the direction in which the cart-robot 100 moves. Alternatively, when the cart-robot 100 moves rearward, the obstacle sensors may be disposed on the front side, the rear side, and two lateral sides thereof.

Similarly, the camera sensors 260 may be disposed at various positions at which the obstacle sensors 200 are disposed depending on the purpose of acquisition of an image. For example, when it is intended to acquire forward image information, the camera sensors 260 may be disposed on the front side of the cart-robot 100. Alternatively, when it is intended to acquire lower image information, the camera sensors 260 may be disposed on the lower side of the cart-robot 100.

On the other hand, in autonomous traveling in which the cart-robot 100 travels without requiring the control of a user or semi-autonomous traveling in which the cart-robot 100 travels while assisting a user's force under the control of the user, the cart-robot 100 needs to rapidly recognize a space. For example, when a special space (such as a checkout counter line, a moving walk, a fresh food refrigerator area, a logistics area, or a product transportation of container box) in which a plurality of cart-robots 100 are provided and movement thereof are restricted, a cart-robot 100 needs to move without collision with another user or another cart-robot. For this purpose, the camera sensors 260 of the cart-robot 100 can be used in the present disclosure.

The control unit 250 of the cart-robot 100 may further include an artificial intelligence module. When information sensed or imaged by the obstacle sensors 220 or the camera sensors 260 is supplied to the control unit 250, the artificial intelligence module in the control unit 250 can receive the supplied information and determine whether the cart-robot has entered the special space. Exemplary embodiment of the artificial intelligence module include machine learning and a deep learning network.

The control unit 250 of the cart-robot can perform context awareness using the artificial intelligence module. Similarly, the control unit 250 can recognize the context of the cart-robot 100 using sensed values, the control of a user, or information received from other cart-robots or a server as input values of the artificial intelligence module. Particularly, the artificial intelligence module of the control unit 25 can provide a determination function in context recognition such as whether the cart-robot 100 should move along markers in a special space or should move under the control of a user regardless of indication of the markers.

The control unit 250 of the cart-robot can construe input image information using the artificial intelligence module. That is, the control unit 250 can perform image processing. That is, markers can be identified from an input image.

The artificial intelligence module includes an inference engine, a neural network, and a probability model. The artificial intelligence module can perform supervised learning or unsupervised learning based on various data.

The artificial intelligence module can recognize a user's voice and perform natural language processing to extract information from the recognized voice.

The control unit 250 of the cart-robot 100 provides a voice recognition function and a text-to-speech (TTS) function.

Exemplary embodiments in which a cart-robot 100 recognizes a special space in which movement of robots is congested and the cart-robot 100 moves automatically will be described below. The cart-robot 100 can recognizes markers disposed on a floor surface or a wall of the space. An example of each marker is a light source that emits light of a special color. Alternatively, an exemplary embodiment of the marker is an indicator having a fixed pattern. The cart-robot 100 can operate in a marker tracking traveling mode in which markers are tracked.

Figure 3:
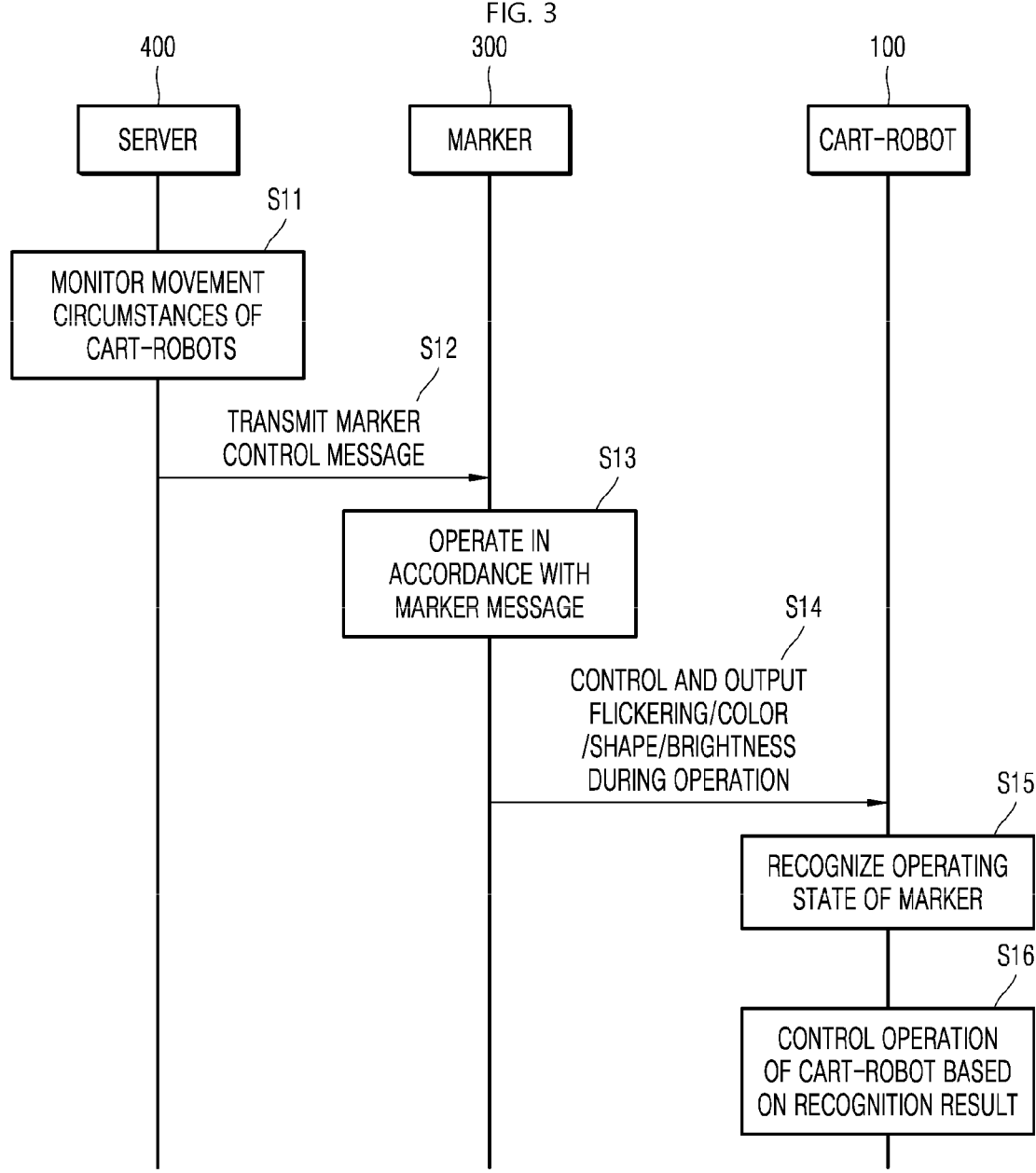
FIG. 3 is a sequence diagram illustrating interactions between a marker disposed in a special space, a server for controlling the marker, and a cart-robot according to an embodiment of the invention.

FIG. 3 illustrates interactions between a marker disposed in a special space, a server for controlling the marker, and a cart-robot according to an embodiment of the invention. In FIG. 3 the marker includes a light source that emits light in various forms.

For example, when the marker includes a plurality of light sources, a color and a flickering speed alight which is emitted from the light sources and ON/OFF of the light sources determine a color, a flickering pattern, or a shape of the marker. Accordingly, the control unit 250 uses the color, the flickering pattern, or the shape of the marker as information to calculate a moving speed or a moving direction of a cart-robot in a space in which the marker is disposed.

The server 400 monitors movement circumstances of cart-robots 100 using various information collection devices of a space in which the cart-robots operate (S11). Collection devices (cameras, CCTVs, sensors, and the like) which are fixed and installed for each section collect moving speeds of the cart-robots, the number of cart-robots, and the like.

Alternatively, the collection devices that collect information on movement circumstances of the cart-robots include the marker 300.

The server 400 transmits a control message for controlling each marker based on the monitoring result (S12). For example, the server 400 ascertains the number of cart-robots 100 which are provided near a checkout counter and causes the markers disposed near the checkout counter to control entrance speeds of the cart-robots 100 or to instruct entrance and exit thereof. For example, the server 400 may transmit a control message for controlling a color of light which is output from each marker to the marker 300. Alternatively, the server 400 can transmit a control message for controlling a flickering speed of light which his output from each marker to the marker 300. The markers 300 may have light sources which are different in arrangement or different in brightness and size depending on the positions thereof.

The marker 300 operates in accordance with a received marker control message (S13). The marker 300 causes the light sources to flick or to output a specific color, or to output light with a specific pattern/brightness control led (S14).

A cart-robot 100 recognizes an operating state of the markers 300 (S15). The operation of the cart-robot is controlled based on the result of recognition (S16). For example, the control unit 250 can control the moving speed or entrance/exit of the cart-robot 100 depending on characteristics of light which is output from the markers 300 in a checkout counter.

Figure 4:
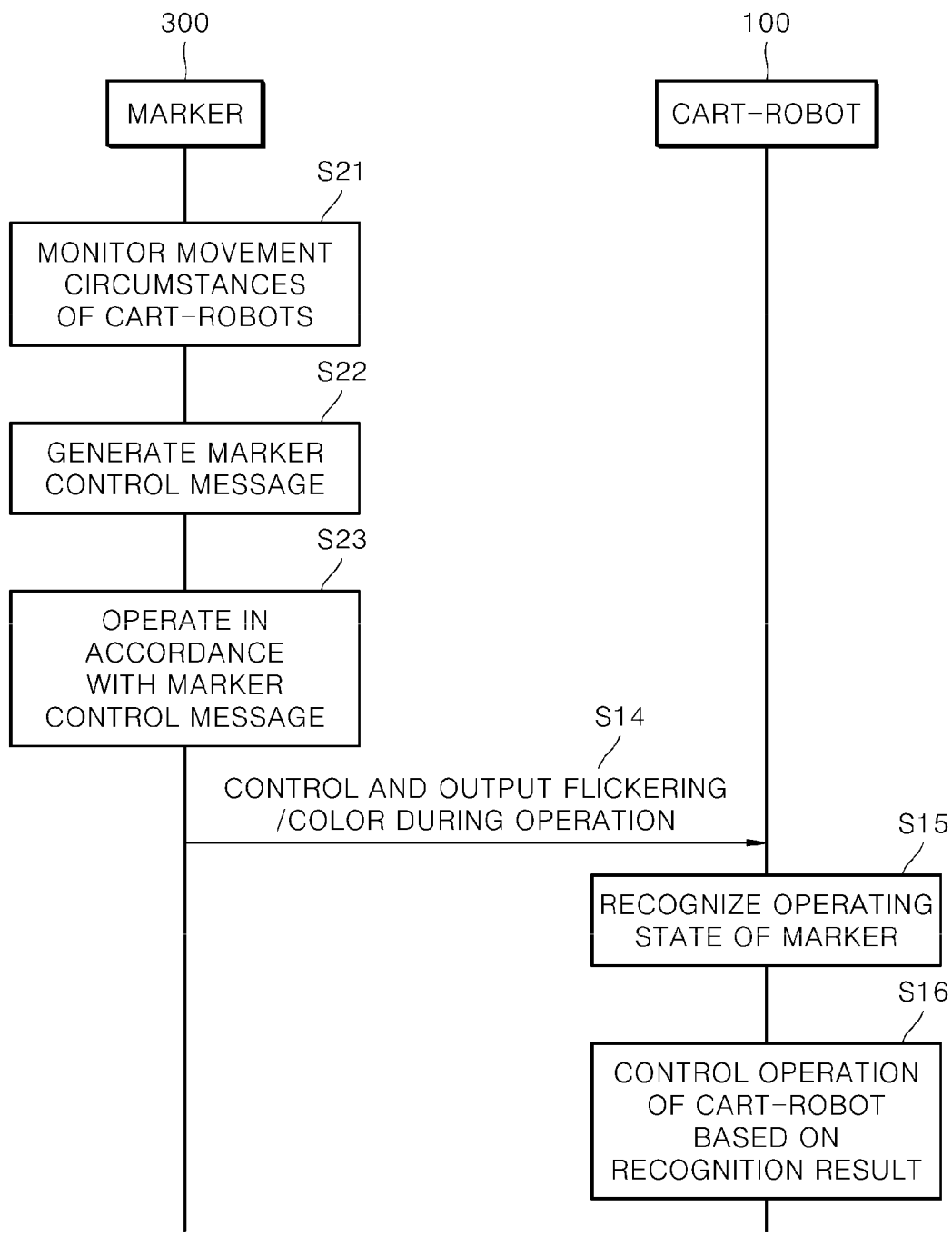
FIG. 4 is a sequence diagram illustrating a routine of causing a marker to monitor movement circumstances of a cart-robot according to another embodiment of the invention.

FIG. 4 illustrates a routine of causing a marker to monitor movement circumstances of a cart-robot according to another embodiment of the invention.

The marker 300 monitors movement circumstances such as the number of cart-robots which move near the marker or which are present near the marker and characteristics (such as weights) of the cart-robots (S21). As a result of monitoring, the marker 300 generates a control message required for operation of the marker (S22) and operates in accordance with the control message (S23). S14 to S16 are the same as described above with reference to FIG. 3.

Figure 5:
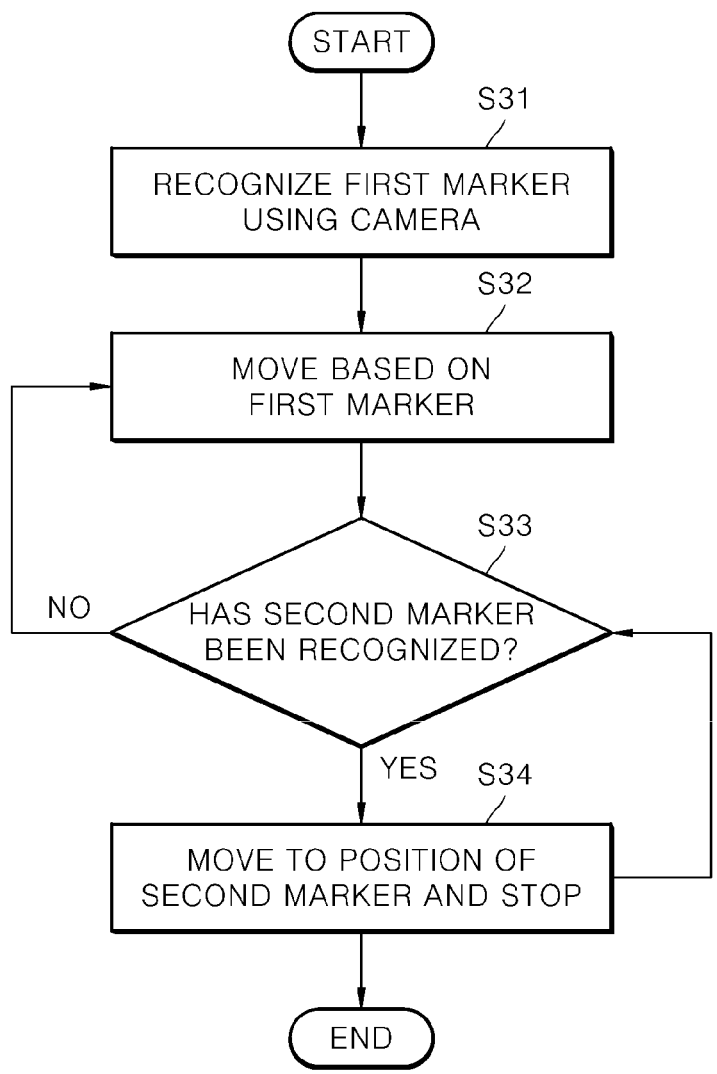
FIG. 5 is a flowchart illustrating a routine of causing a cart-robot to recognize a marker which has a fixed shape and to operate according to another embodiment of the invention.

FIG. 5 illustrates a routine of causing a cart-robot to recognize a marker which has a fixed shape and to operate according to another embodiment of the invention. Markers are disposed in a fixed shape such as a line shape or a dot shape, and a cart-robot 100 operates by recognizing the markers. That is, a cart-robot 100 separately recognizes colors or patterns which are output from the markers. The control unit 250 distinguishes markers such as a first marker, a second marker, and a third marker using shapes or flickering patterns of markers which appear in an image. The control unit 250 controls movement of the cart-robot to correspond to the markers.

The camera sensor 260 of a cart-robot 100 recognizes a first marker which is disposed on the bottom, the wall, or the ceiling of a traveling space (S31). The first marker is assumed to have a line shape. The cart-robot 100 moves along the first marker (S32). In this example, the control unit 250 calculates a moving direction of the cart-robot to be parallel to the first marker. As a result, the cart-robot can move in parallel to the first marker without interfering with other cart-robots in the space.

When the cart-robot 100 recognizes the second marker (S33), the cart-robot 100 stops at the position of the second marker (S34). For example, the second marker is a circular marker or a stop marker as denoted by reference numeral 303 in FIG. 9. When the second marker is recognized, the control unit 250 calculates a moving speed of the cart-robot to correspond to the recognized second marker. For example, the control unit 250 may decrease or increase the moving speed of the cart-robot. In the example illustrated in FIG. 5, the control unit decreases the moving speed.

Figure 8:
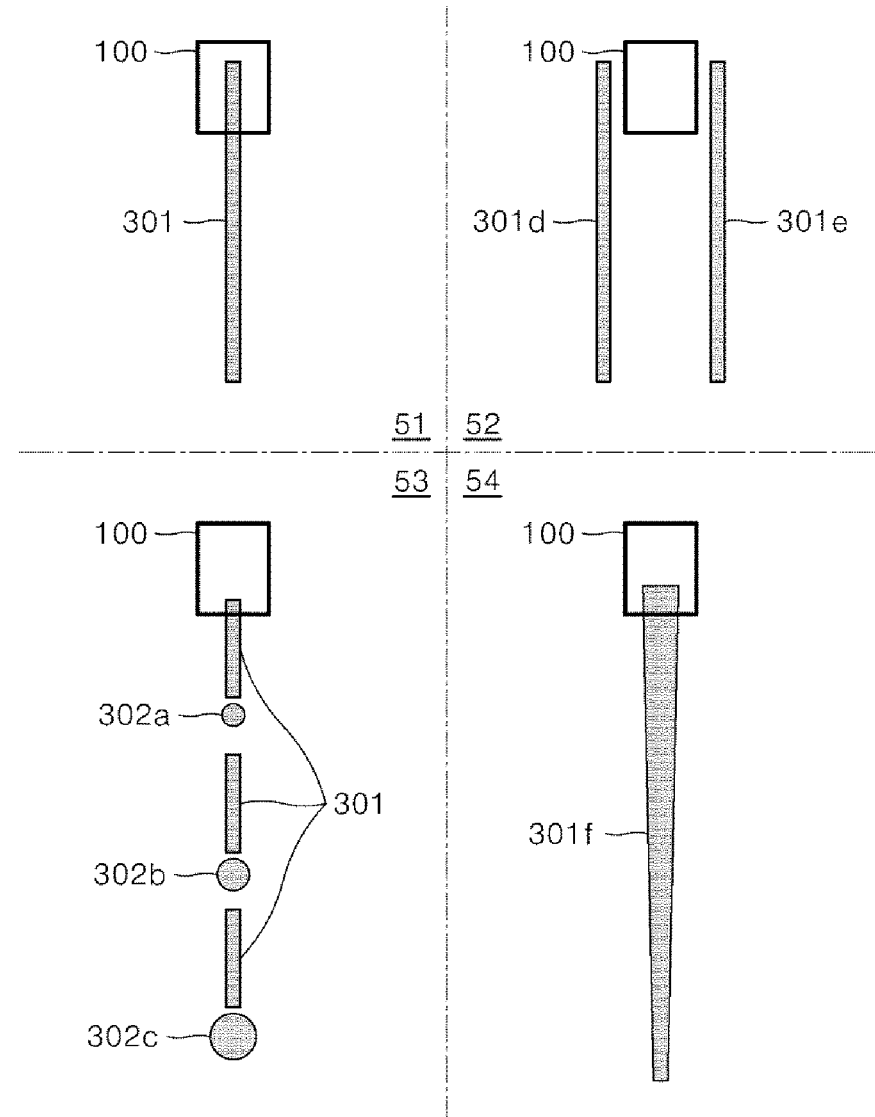
FIG. 8 is a diagram illustrating various examples in which a line marker is disposed according to an embodiment of the invention.
Figure 9:
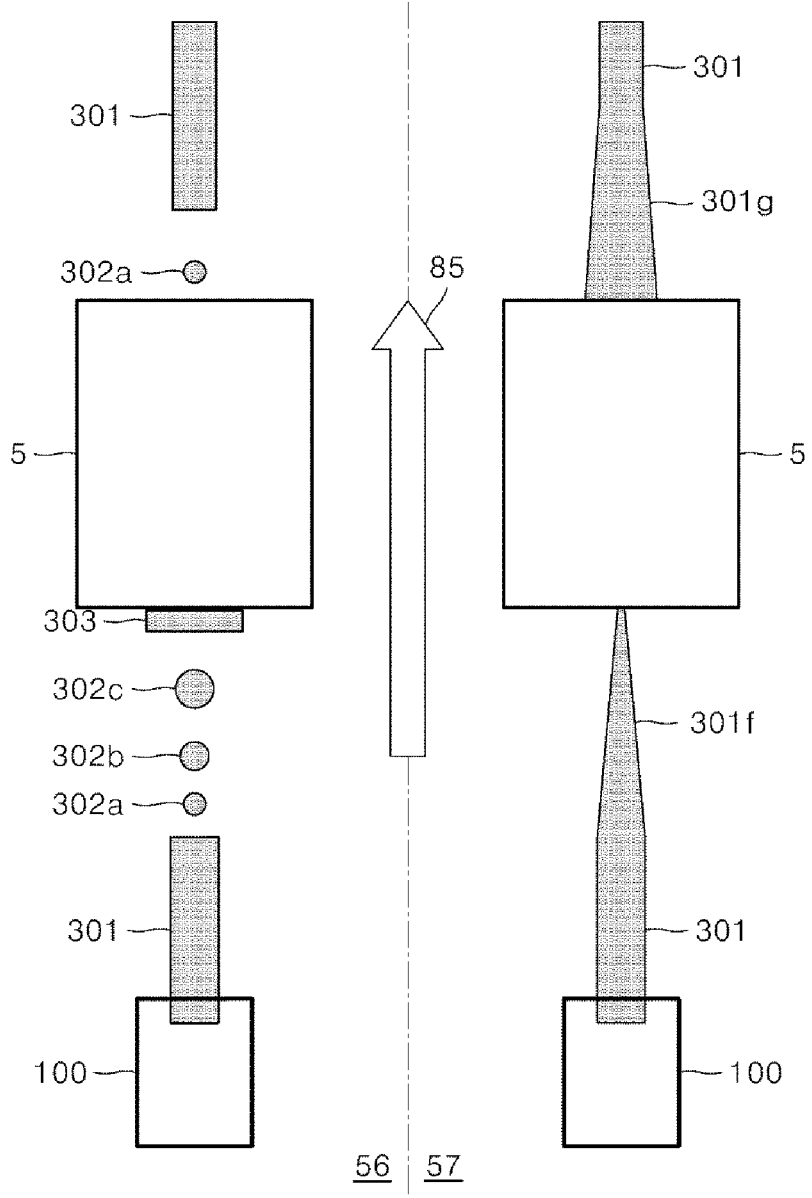
FIG. 9 is a diagram illustrating examples in which markers are disposed in different manners before and after a special space according to an embodiment of the invention.

For example, the second marker may be markers denoted by reference signs 302a, 302b, and 302c in FIGS. 8 and 9 or a marker denoted by reference numeral 303 in FIG. 9. These markers provide information required for the control unit 250 to control the moving speed of the cart-robot.

A mixed type of the first marker and the second marker, for example, a marker having a line shape with a varying width like 30af and 301g in FIG. 9, also provides information required for the control unit 250 to control the moving speed of the cart-robot.

When the second marker is not recognized, the cart-robot 100 repeats Step S32.

In the above-mentioned embodiment, when a marker includes a light source and flicks, changes a color, or exhibits a specific pattern or shape, the cart-robot 100 controls its operation by recognizing them.

Alternatively, the marker may include a fixed light source. Alternatively, the marker may include an indicator plate reflecting light or having a specific color by forming the marker out of a specific material.

The above-mentioned special space refers to a specific space in which behavior of users and traveling of carts are clearly defined such as a checkout counter or a moving walk.

Markers are disposed in advance on the floor or the wall surface of a special space such that the cart-robots operate in a predefined manner in the special space. The marker can change its shape or light depending on circumstances. The marker may have various shapes such as a line shape, a circle shape, and a bar shape.

A routine of causing a cart-robot 100 to perform an operation suitable for a special space will be described below.

Figure 6:
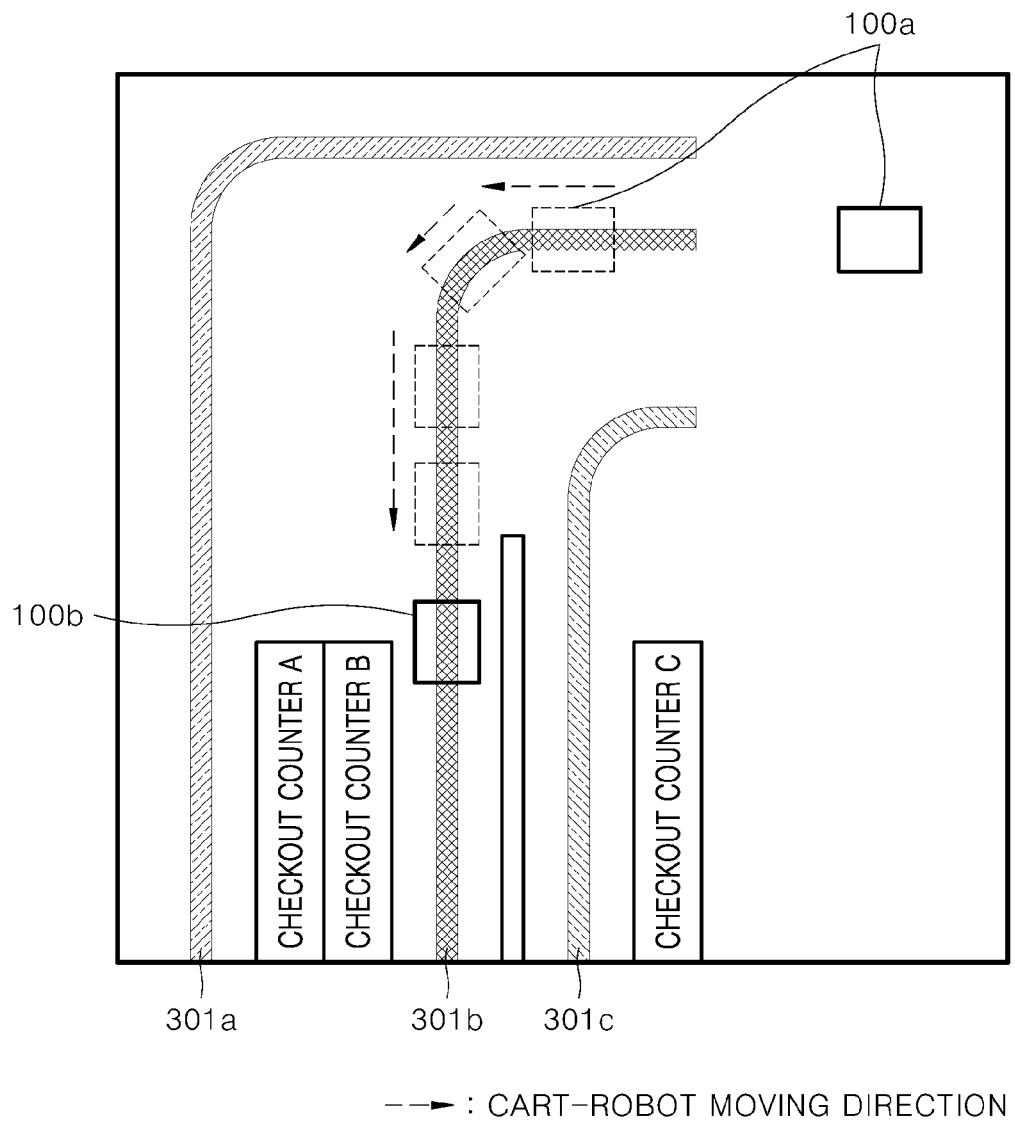
FIG. 6 is a diagram illustrating a routine in which a cart-robot recognizes a marker and lines up according to an embodiment of the invention.

FIG. 6 illustrates a routine in which a cart-robot recognizes a marker and lines up according to an embodiment of the invention.

When a cart-robot 100a is approaching a checkout counter, the camera sensor 260 of the cart-robot 100a senses three line markers 301a, 301b, and 301c. When a marker is a static marker of which an output color or a shape does not change, the camera sensor 260 of the cart-robot 100a recognizes a neighboring marker (for example, 301b) and the cart-robot 100a lines up along the line marker 301b. A trajectory of the cart-robot 100a moved is indicated by a dotted line in FIG. 6.

When the cart-robot 100a senses another cart-robot 100a in front or senses a person, the cart-robot 100a detects a distance and moves forward or stops and waits.

On the other hand, as described above with reference to FIG. 3, the server 400 monitors a process of performing payment in a checkout counter or the number of goods in cart-robots waiting before the checkout counter, the number of cart-robots waiting, or the like. For example, it is assumed that the server 400 determines that Checkout counter B ends its business. In this case, the server 400 can set colors or flickering frequencies of the line markers 301a, 301b, and 301c to be different from each other.

For example, when Checkout counter A is most crowded, Checkout counter C is secondly most crowded, and Checkout counter B is uncrowded, the server 400 controls the line marker 301b such that the cart-robot 100a moves to the line marker 301b of Checkout counter B.

Using a color which is set in advance to prohibit entrance of a cart-robot 100a, the server 400 can control output colors of the line markers 301a and 301c of Checkout counters A and C.

For example, the server 400 performs control such that the line marker 301a of Checkout counter A is red, the line marker 301c of Checkout counter C is orange, and the line marker 301b of Checkout counter B is blue. The cart-robot 100a recognizes Checkout counter B which is uncrowded from the blue line marker 301b and moves to Checkout counter B.

Alternatively, using a flickering speed which is set in advance to prohibit entrance of a cart-robot 100a, the server 400 can control flickering speeds of the line markers 301a and 301c of Checkout counters A and C.

For example, the server 400 performs control such that the line marker 301a of Checkout counter A flicks at intervals of two seconds, the line marker 301c of Checkout counter C flocks at intervals of three seconds, and the line marker 301b of Checkout counter B flocks at intervals of five seconds. The cart-robot 100a recognizes that Checkout counter B is uncrowded from the line marker 301b having a lowest flickering speed and moves to Checkout counter B.

The exemplary embodiment of using the line markers in FIG. 6 can be applied to a space in which cart-robots line up and move such as a moving walk in addition to a checkout counter.

In the exemplary embodiment illustrated in FIG. 6, the server 400 controls light output characteristics of markers such as colors or flickering of the markers such that cart-robots move with progress of checkout in the checkout counter or cart-robots 100 are efficiently distributed to a plurality of checkout counters depending on lengths of waiting lines or waiting times in checkout counters.

Figure 7:
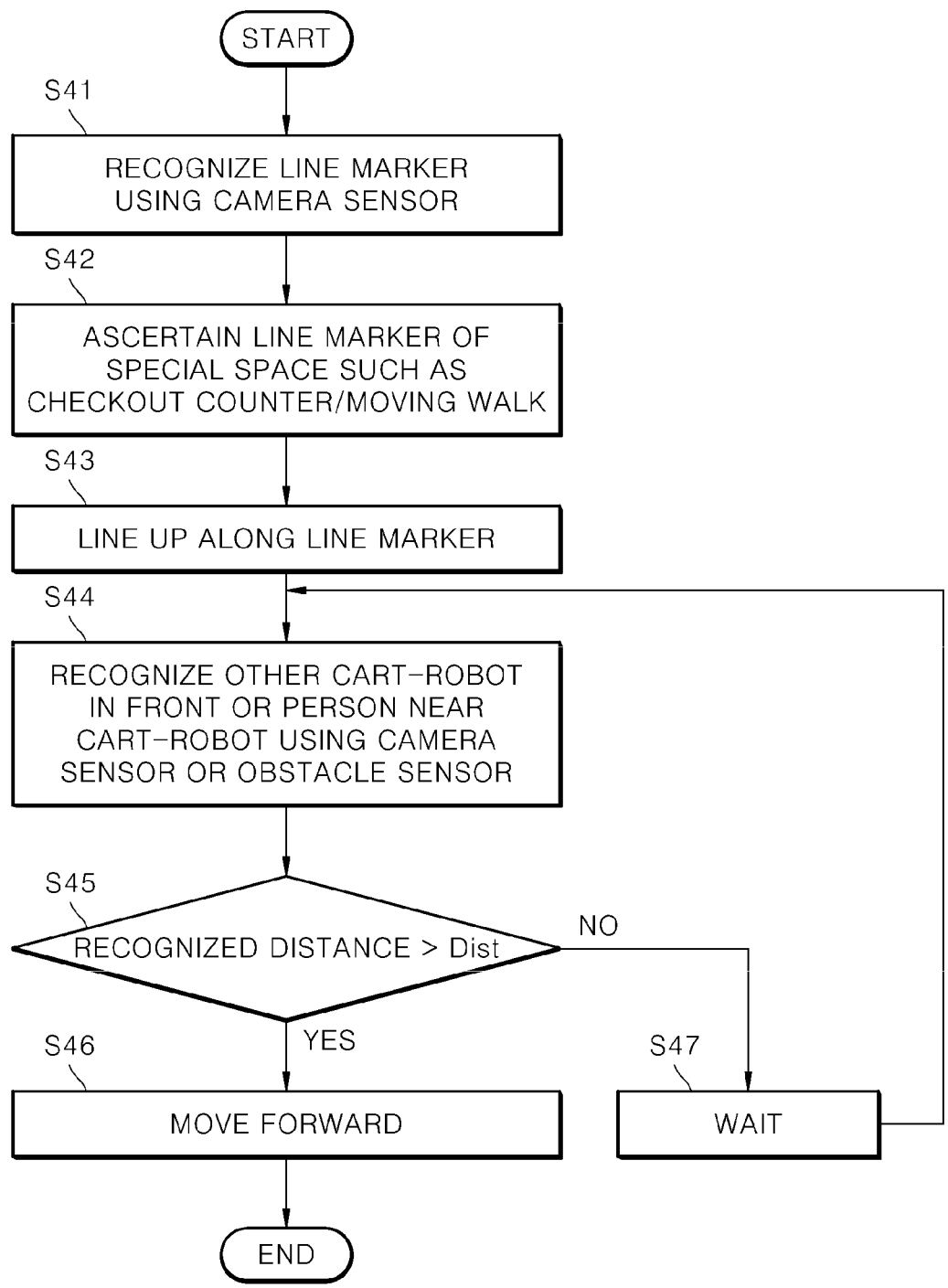
FIG. 7 is a flowchart illustrating a routine of causing a cart-robot to recognize a line marker and to move according to an embodiment of the invention.

FIG. 7 illustrates a routine of causing a cart-robot to recognize a line marker and to move according to an embodiment of the invention.

A cart-robot 100 recognizes a line marker using a camera sensor (S41). Then, the cart-robot 100 ascertains whether the line marker is a line marker in a special space such as a checkout counter or a moving walk (S42). Then, the cart-robot 100 lines up along the line marker (S43).

Thereafter, the cart-robot 100 recognizes another cart-robot in front or a person near the cart-robot using the camera sensor 260 or the obstacle sensor 220.

When a detected distance is greater than a preset reference "Dist" (S45), the control unit 250 of the cart-robot 100 moves the cart-robot forward (S46). When it is determined in S45 that the distance is less the preset reference "Dist" (S45), the cart-robot waits (S47) and repeatedly performs S44 and S45 of detecting a distance.

In the exemplary embodiment illustrated in FIG. 7, when the control unit 250 ascertains a marker for controlling a moving speed in an image and increases the moving speed of the cart-robot to correspond to the marker and then the obstacle sensor 220 senses an obstacle in the moving direction of the cart-robot, the control unit 250 stops the cart-robot. Until a distance between an obstacle and the cart-robot 100 increases, the control unit 250 ignores information which is provided from the sensed marker and stops the cart-robot 100.

In FIG. 6, a line marker is provided for each checkout counter, and may be disposed along the width of the cart-robot.

FIG. 8 illustrates various exemplary embodiments in which a line marker is disposed according to an embodiment of the invention.

In reference numeral 51, one line marker 301 is provided as described above with reference to FIG. 6.

When the camera sensor 260 of the cart-robot 100 images the line marker 301, the control unit 250 determines the position of the line marker 301 in the captured image. Then, the control unit 250 moves the cart-robot 100 such that the line marker 301 is located at the center of the bottom of the cart-robot 100.

In reference numeral 52, two line markers 301d and 301e are provided. When the camera sensor 260 of the cart-robot 100 images the line markers 301, the control unit 250 determines positions of the line markers 301d and 301 e in the captured image. Then, the control unit 250 moves the cart-robot 100 such that the line markers 301d and 301e are located on both sides of the bottom of the cart-robot 100.

In reference numeral 53, line markers 301 and circular markers 302a, 302b, and 302c are provided. When the camera sensor 260 of the cart-robot 100 images the line markers 301, the cart-robot 100 moves forward. When the camera sensor 260 of the cart-robot 100 senses the circular markers 302a, 302b, and 302c, the cart-robot 100 stops. When there is no cart-robot or person in front, the cart-robot 100 moves forward.

The circular markers 302a, 302b, and 302c may be configured to have different sizes. Particularly, the circular marker 302c may be set to be large or small, or a color and a flickering speed of light output from a light source of the circular marker 302c may be set to vary such that the cart-robot 100 can stop when it approaches a checkout counter or a moving walk.

The routine illustrated in FIG. 5 can be applied to reference numeral 53, where the first marker in FIG. 5 corresponds to the line markers 301 and the second marker in FIG. 5 corresponds to the circular markers 302a, 302b, and 302c. The second marker may have a shape or color which is distinguished from that of the line marker, such as a rectangular shape or a triangular shape in addition to the circle shape.

In reference numeral 54 illustrated in FIG. 8, a width of a line marker varies to decrease or increase the moving speed of the cart-robot 100. The width of the line marker 301f in reference numeral 54 decreases in the forward direction. The camera sensor 260 of the cart-robot 100 senses change of the width. The control unit 250 adjusts the moving speed of the cart-robot 100 depending on the sensed width. The control unit 250 can adjust the moving speed of the cart-robot 100 to decrease or increase.

As described above with reference to FIG. 3, the server 400 can sense moving speeds of carts in a special space and increase or decrease the width of the line marker 301f. In this case, the line marker 301f may include a plurality of LED light sources and colors of the light sources can be adjusted.

In reference numeral 54 in FIG. 8, the line marker 301f is a line marker of which the width increases or decreases. The control unit 250 can increase or decrease the moving speed of the cart-robot 100 in proportion to or in inverse proportion to the width of the line marker.

FIG. 9 illustrates examples in which markers are disposed in different manners before and after a special space according to an embodiment of the invention. Example of reference numeral 53 or 54 in FIG. 8 is employed. An arrow 85 between reference numeral 56 and 57 refers to a moving direction of a cart-robot.

Reference numeral 56 is an example by employing exemplary embodiment of reference numeral 53 in FIG. 8. Reference numeral 57 is an example by employing exemplary embodiment of reference numeral 54 in FIG. 8. Examples of a special space 5 in FIG. 9 include a moving walk and a checkout counter.

A line marker 301 is provided to guide entrance into the special space 5. The camera sensor 260 images the line marker 301. When the line marker 301 appears first in an image captured by the camera sensor 260, the control unit 250 of the cart-robot 100 disposes the cart-robot 100 to be parallel to the line marker 301. Here, the moving speed of the cart-robot 100 which is set by the control unit 250 at a time point at which the line marker 301 appears in the image is v1 (a first speed).

Under the control of the control unit 250, the cart-robot 100 can enter the special space 5 in parallel to the line marker.

In the course of entrance in exemplary embodiment of reference numeral 56, the camera sensor 260 of the cart-robot 100 images circular markers 302a, 302b, and 302c. In the course of entrance in reference numeral 57, the camera sensor 260 of the cart-robot 100 images decrease of the width of the line marker 301f.

The control unit 250 analyzes the image captured by the camera sensor 260 and decreases the moving speed of the cart-robot 100. The control unit 250 can decrease the moving speed in proportion to or in inverse proportion to the sizes of the circular markers 302a. 302b, and 302c or the width of the line marker 301f.

Then, the control unit 250 determines that the art-robot 100 has entered the special space 5. In reference numeral 56, when the camera sensor 260 images a stop marker 303, the control unit 250 determines that the cart-robot 100 has entered the special space 5.

In reference numeral 57, when the camera sensor 260 does not image the line marker 301f any more, the control unit 250 determines that the cart-robot 100 has entered the special space 5.

In the special space 5, the cart-robot 100 is kept in a stopped state. For example, when the special space 5 is a moving work, the control unit 250 holds or stops a motor of the movement unit of the cart-robot 100 to stop the cart-robot 100.

Then, in the course of exit from the special space 5, a marker may be provided on an exit side of the special space 5 such that the cart-robot 100 can exit at a high speed.

In reference numeral 56, a circular marker 302a is provided on the exit side and a line marker 301 extends to be subsequent thereto. When the camera sensor 260 images the circular marker 302a and the line marker 301, the control unit 250 determines that the cart-robot has exited from the special space 5 and increases the moving speed of the cart-robot 1.

In reference numeral 57, when it is determined from the image captured by the camera sensor 260 that a line marker 301g with a large width is provided on the exit side and the width thereof decreases gradually, the control unit 250 determines that the cart-robot has exited from the special space 5 and increases the moving speed of the cart-robot 100.

For example, exit from the special space 5 may be exit from a moving walk. The control unit 250 increases electric energy which is applied to a motor of the movement unit of the cart-robot 100 and causes the motor to apply a large force to the movement unit such that the cart-robot 100 can exit at a high speed and then gradually decrease the moving speed.

That is, in exemplary embodiment of reference numerals 56 and 57 in FIG. 9, markers 301, 301f, 302a, 302b. 302c, and 303 are provided in an entrance area of the moving walk 5 and markers 302a, 301, and 301g are provided in an exit area of the moving walk 5.

When the markers appear first in the image captured by the camera sensor, the control unit 250 moves the cart-robot at a first speed v1.

Thereafter, when the cart-robot 100 approaches the moving walk, the markers disappear in the image captured by the camera sensor 260. In this case, the control unit 250 stops the cart-robot 100. The cart-robot 100 is kept in the stopped state in the moving walk.

Thereafter, when the camera sensor 260 captures an image of the markers 302a and 301g in the exit area, the control unit 250 ascertains the markers in the image. The control unit 250 moves the cart-robot 100 at a speed (a second speed) higher than the first speed v1.

Figure 10:
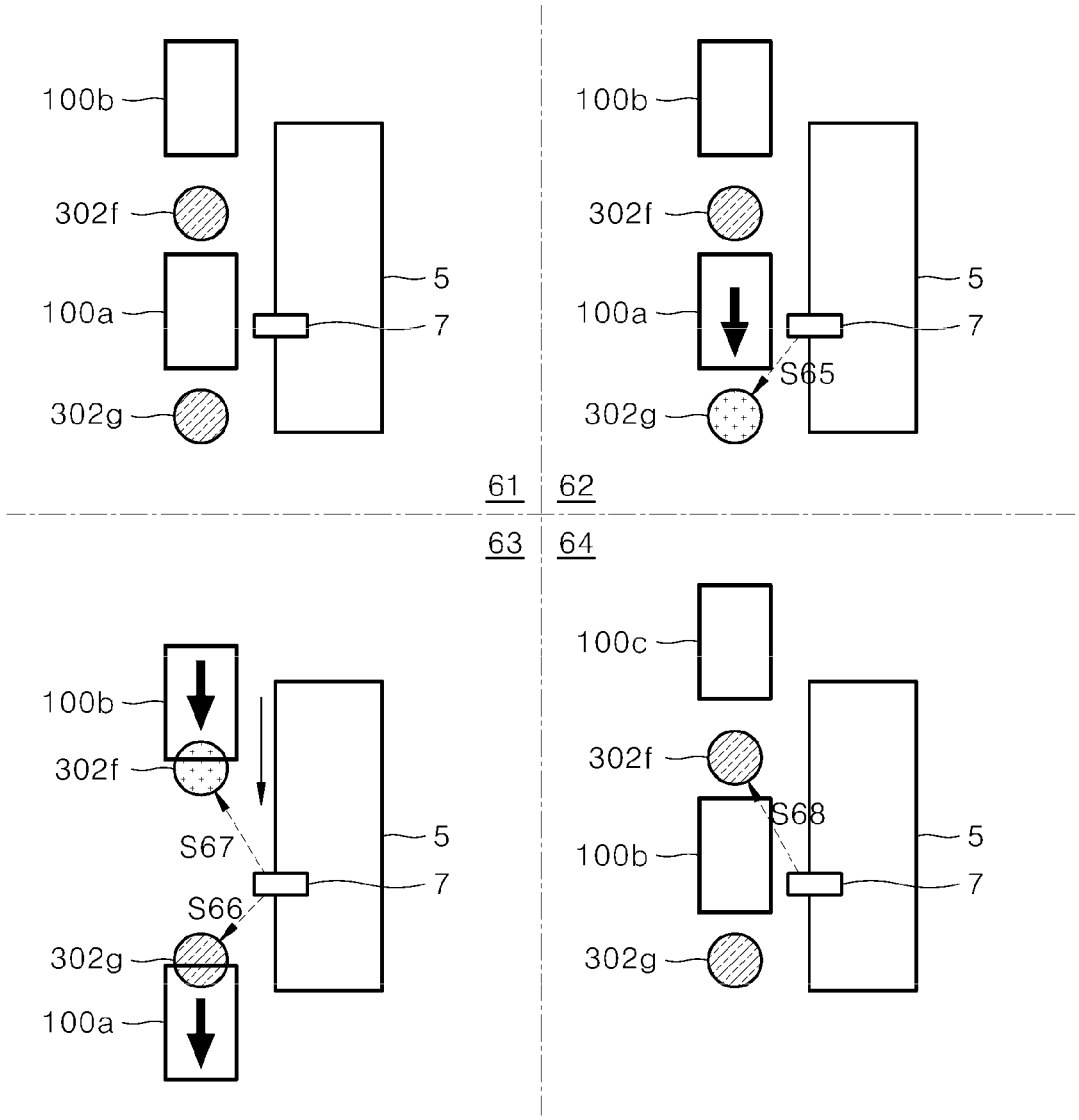
FIG. 10 is a diagram illustrating a routine in which markers operate to control whether a cart-robot is to be move in a special space depending on circumstances according to an embodiment of the invention.

FIG. 10 illustrates a routine in which markers operate to control whether a cart-robot is to be moved in a special space depending on circumstances according to an embodiment of the invention.

It is assumed that the special space 5 in FIG. 10 is a checkout counter. The special space such as a checkout counter is a space in which a cart-robot 100 performs a predetermined operation (checkout) and moves after the operation. Accordingly, a module that recognizes an object or a marker control module 7 that monitors progress of checkout or payment is provided in a counter tray. The marker control module 7 transmits a message for controlling the markers 302f and 302g to markers 302f and 302g depending on operation circumstances of the checkout counter.

The markers 302f and 302g have two modes including a first mode (a stopping mode) and a second mode (a moving mode). When the markers 302f and 302g are in the first mode and camera sensors 260 of cart-robots 100a, 100b, and 100c capture images thereof, the control units 250 stop the cart-robots 100a, 100b, and 100c.

When the markers 302f and 302g are in the second mode and the camera sensors 260 of the cart-robots 100a, 100b, and 100c capture images thereof, the control units 250 move the cart-robots 100a, 100b, and 100c forward. In the first mode, the markers 302f and 302g output red light. In the second mode, the markers 302f and 302g output green light. In addition, the markers 302f and 302g can set a flickering speed or an output image (an arrow, a star, a circle, a triangle, or the like) to vary in addition to a color.

As illustrated in reference numeral 61, a first cart-robot 100a that performs a checkout operation in the checkout counter senses the first marker 302g in the first mode and maintains the stopped state. Similarly, a second cart-robot 100b senses the second marker 302f in the first mode and maintains the stopped state.

The marker control module 7 of the counter tray ascertains whether an object which is not settled remains in the tray of the checkout counter 5. The marker control module 7 can ascertain whether objects are piled on the counter tray using a particular camera sensor, a distance sensor, a weight sensor, or the like.

Alternatively, the marker control module 7 may determine that the cart-robot 100 is not able to move until settlement has completed in combination with a settlement system.

On the other hand, when objects are piled in the tray of the checkout counter 5, the marker control module 7 determines that settlement is not completed yet. As a result, as illustrated in reference numeral 61, the marker control module 7 maintains the current mode (the first mode) of the markers 302f and 302g.

As illustrated in reference numeral 62, when the marker control module 7 determines that no object is piled in the tray of the checkout counter 5, the marker control module 7 transmits a control message for switching the mode of the first marker 302g to the second mode to the first marker 302g (S65). As a result, the mode of the first marker 302g is switched to the second mode and the first cart-robot 100a moves forward.

When the first cart-robot 100a moves forward and departs from the first marker 302g (see reference numeral 63), the marker control module 7 transmits a control message for switching the mode of the first marker 302g to the first mode to the first marker 302g (S66).

Then, the marker control module 7 transmits a control message for switching the mode of the second marker 302f to the second mode to the second marker 302f such that the second cart-robot 100b moves forward (S67). As a result, the second cart-robot 10b moves forward.

In reference numeral 64, the second cart-robot 100b senses the first marker 302g in the first mode and stops. The third cart-robot 100c located behind the second cart-robot 100b also senses the second marker 302f in the first mode and stops.

As illustrated in FIG. 10, when the markers 302g and 302f in front are in the first mode, the cart-robots 100a. 100b, and 100c move to the position at which the marker 302g or 302f is located and stops. The cart-robots 100a, 100b, and 100c wait until predetermined operations (for example, a checkout operation) are completed.

When the specific marker 302g or 302f in front is switched to the second mode, the cart-robots 100a. 100b, and 100c move forward. When the checkout operation is completed or the cart-robots in front move forward, the markers are switched to the second mode.

In the above-mentioned example, a cart-robot can operate by autonomous traveling in a specific space (a special space) for the purpose of convenience of a user.

Particularly, when a line marker for controlling traveling is disposed in advance on the floor or the wall of a shop in the vicinity of a checkout counter or a moving walk, the camera sensor 260 attached to the front surface or the bottom surface of a cart-robot recognizes the line marker. When the line marker is ascertained in an image captured by the camera sensor 260, the control unit 250 controls the cart-robot 100 such that cart-robot 100 travels along the line marker.

When the special space is a checkout counter, a position or shape of a line of cart-robots 100 waiting in the checkout counter or an operation type of the cart-robot 100 is determined. Alternatively, as in reference numeral 61 in FIG. 10, when a user of the cart-robot 100a is performing settlement, the cart-robot 100b behind it and the cart-robot 100a are on a standby state.

When checkout is completed, the cart-robot 100a moves forward and the cart-robot 100b behind it also moves forward. In FIG. 10, the markers 302f and 302g charge their modes to control forward movement and stop of the cart-robots.

That is, the cart-robots can identify the markers and travel autonomously depending on the shapes of the markers. The operation type of a cart-robot that repeatedly moves forward and stops in a checkout counter or the operation type of a cart-robot that stops operation of a motor after entering a moving walk and drives the motor at the time of exiting from the moving walk can be embodied using the markers and the camera sensors 260.

When a cart-robot 100 move autonomously in a special space, a user does not need to control the cart-robot and thus the user can easily perform an operation using the cart-robot. In a space such as a shop, a user can control and move a cart-robot in a power assist mode (a semi-autonomous traveling mode) using the handle assembly 120. Alternatively, a user may control a cart-robot such that the cart-robot moves to follow the user using the transmitter module 500.

On the other hand, a cart-robot can recognize markers and move autonomously in a special space such as a moving walk. In this case, the interface unit 230 of the cart-robot 100 outputs switching to an autonomous traveling mode by voice or a text message based on the result of marker recognition such that a user can ascertain the switching.

When a cart-robot moves or stops along a marker and a user operates the handle assembly 120, the control unit 250 allows the cart-robot 100 to move accordingly, to the user's intention. In this case, the cart-robot 100 can depart from a line marker or pass through a circular mark.

In the example illustrated in FIG. 10, the communication unit 290 transmits a result of movement to a marker when the cart-robot 100a, 100b, or 100c moves.

In reference numerals 62 and 63, the first cart-robot 100a passes through the first marker 302g. In this case, the communication unit 280 of the first cart-robot 100a directly transmits a result of movement to the first marker 300g. Accordingly, the first marker 300g can be switched from the second mode to the first mode.

Figure 11:
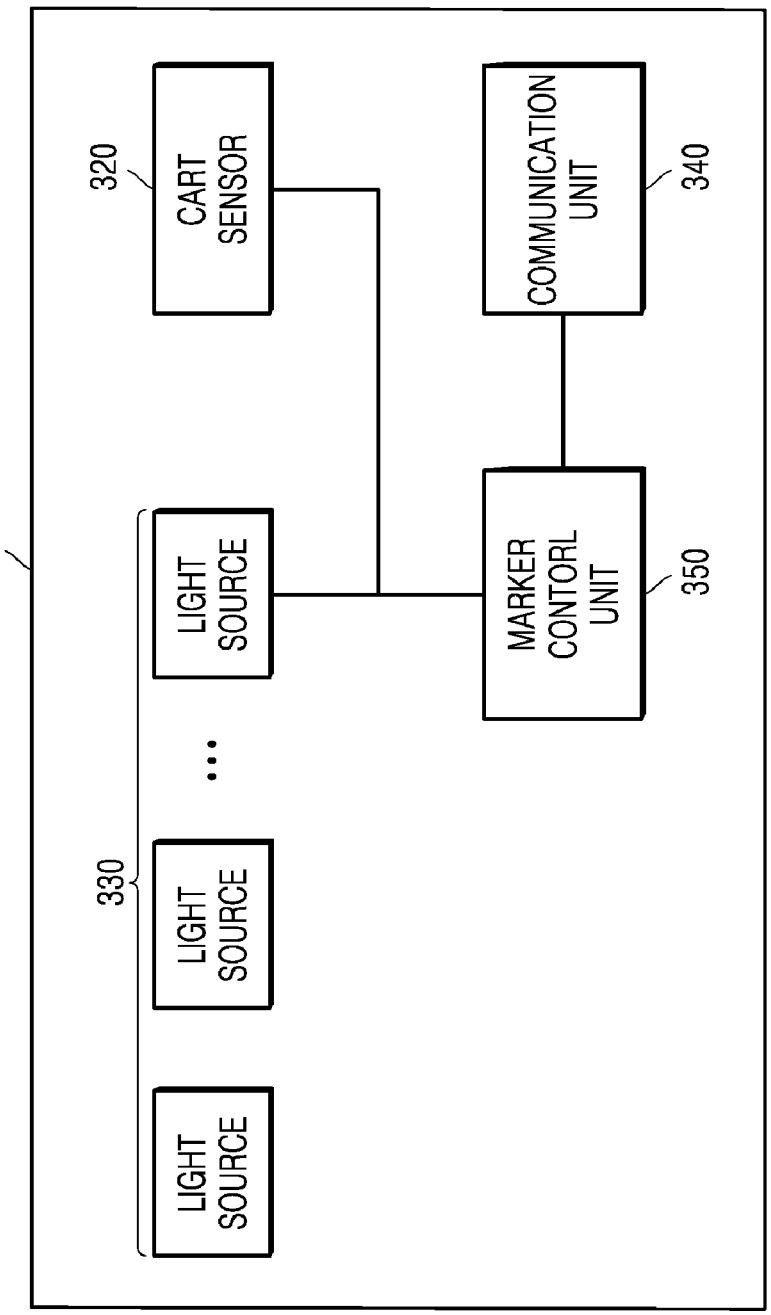
FIG. 11 is a block diagram illustrating elements of a marker according to an embodiment of the invention.

FIG. 11 illustrates elements of a marker according to an embodiment of the invention. A marker 300 includes one or more light sources 300. The light source 300 emits light. A marker control unit 350 controls emission of light from the light source. The marker control unit 350 controls a color of light and ON/OFF and a flicking speed of the light source.

When one marker 300 includes a plurality of light sources, colors, ON/OFF, flickering speeds of the light sources constitute information. When the camera sensor 260 of the cart-robot 100 images the marker, the control unit 250 analyzes features such as the color, the shape, and the flickering of the marker as information and controls movement of a cart-robot 100.

A communication unit 340 receives a control message for controlling the operation of a marker from the server 400 or the marker control module 7. Alternatively, the communication unit 340 can receive a result of movement from a cart-robot 100.

A cart sensor 320 senses a result of movement of a cart-robot. For example, the cart-robot 100 outputs a signal in a specific pattern and the cart sensor 320 senses the signal to ascertain the result of movement of the cart-robot 100.

That is, the cart sensor 320 can sense results of movement of cart-robots 100 and the marker control unit 350 can calculate the moving speeds of the cart-robots. Then, the marker control unit 350 can control a light color, a flickering pattern, or ON/OFF of the light source 330 according to the moving speed of a cart-robot.

Figure 12:
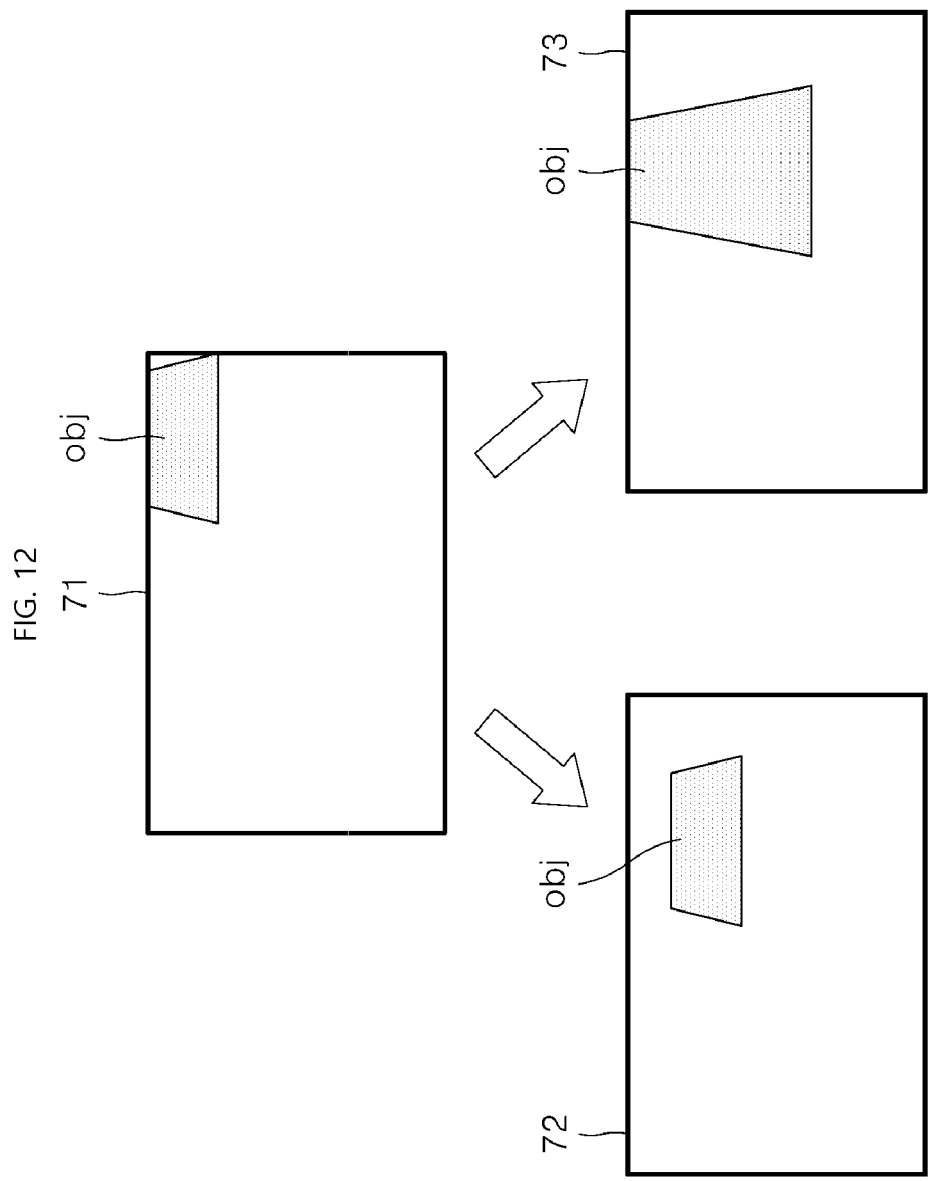
FIG. 12 is a diagram illustrating a control routine of a camera sensor according to an embodiment of the invention.

FIG. 12 illustrates a control routine of a camera sensor according to an embodiment of the invention.

In order to identify markers in a space in which a cart-robot 100 moves, the camera sensor captures an image in a specific direction (an image of a traveling floor, a side surface, or the like). Here, when an object having a high likelihood of a marker appears in an image captured by the camera sensor 260, the control unit 250 can change an angle of the camera sensor and capture an image again.

For example, as in reference numeral 71 in FIG. 12, an image is captured and the control unit 250 ascertains an object denoted by "obj". When the object is similar to a marker in color or shape, the control unit 250 changes the direction of the camera sensor 260 and captures an image with the object "obj" close to the center thereof. As a result, the camera sensor 260 can capture an image as in reference numerals 72 or 73.

In the image illustrated in reference numeral 72, the control unit 250 determines that the object "obj" is not a marker. In the image illustrated in reference numeral 73, the control unit 250 determines that the object "obj" is a marker.

When a user controls the handle assembly 120 and moves a cart-robot 100 semi-automatically and the cart-robot 100 senses a marker, the cart-robot 100 first adjusts the moving direction and the moving speed to correspond to the marker. The user can operate the handle assembly 120 when the cart-robot 100 is moving according to the adjusted direction and speed. As a result, when the user operates the handle assembly 120 such that the cart-robot 100 moves in a direction different from the direction in which the cart-robot 100 moves to correspond to the marker, the control unit 250 temporarily stops marker tracing traveling of the cart-robot 100 and performs a semi-autonomous traveling mode in which the user's operation is allowed.

Thereafter, when movement of the cart-robot 100 based on the user's operation is switched to movement of the cart-robot 100 corresponding to the marker, the cart-robot 100 can be moved in response thereto. A dotted line 101 at the center of the cart-robot 100 refers to a forward movement centerline of the cart-robot and serves as a reference when the control unit 250 adjusts the gap between the marker and the cart-robot 100.

Figure 13:
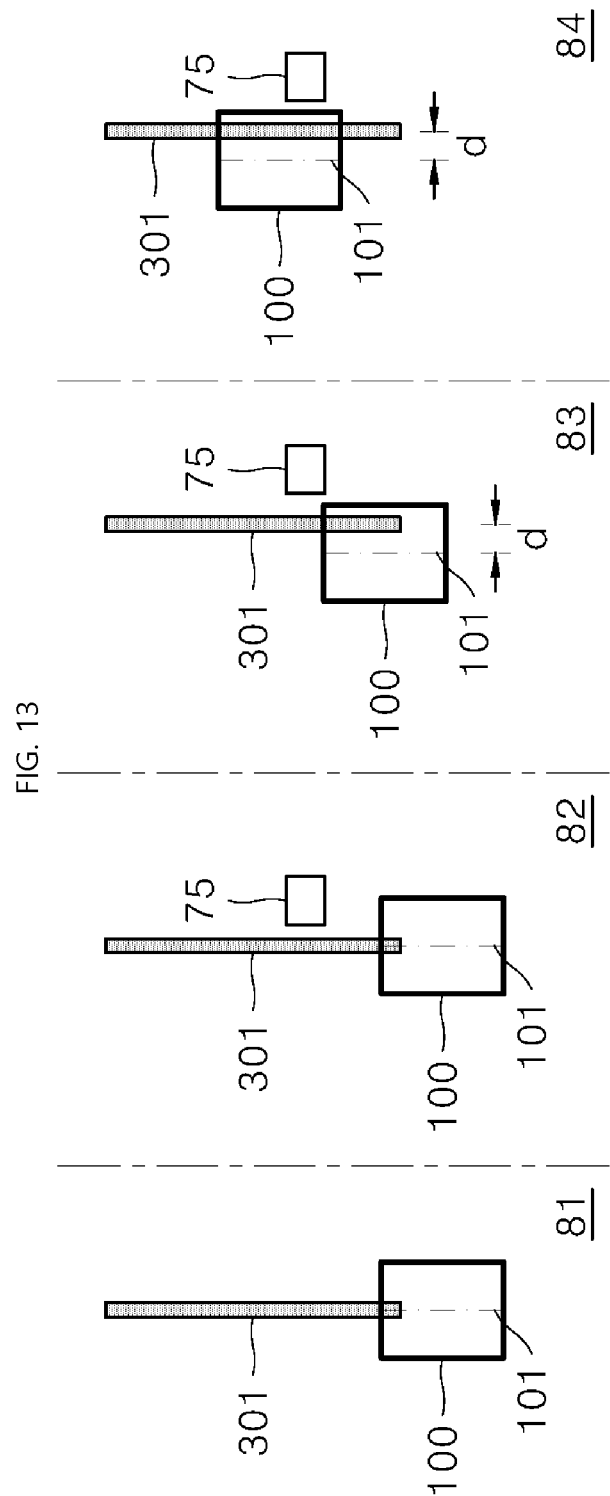
FIGS. 13 and 14 are diagrams illustrating routines in which a cart-robot performs semi-autonomous traveling and marker tracking traveling according to an embodiment of the invention.
Figure 14:
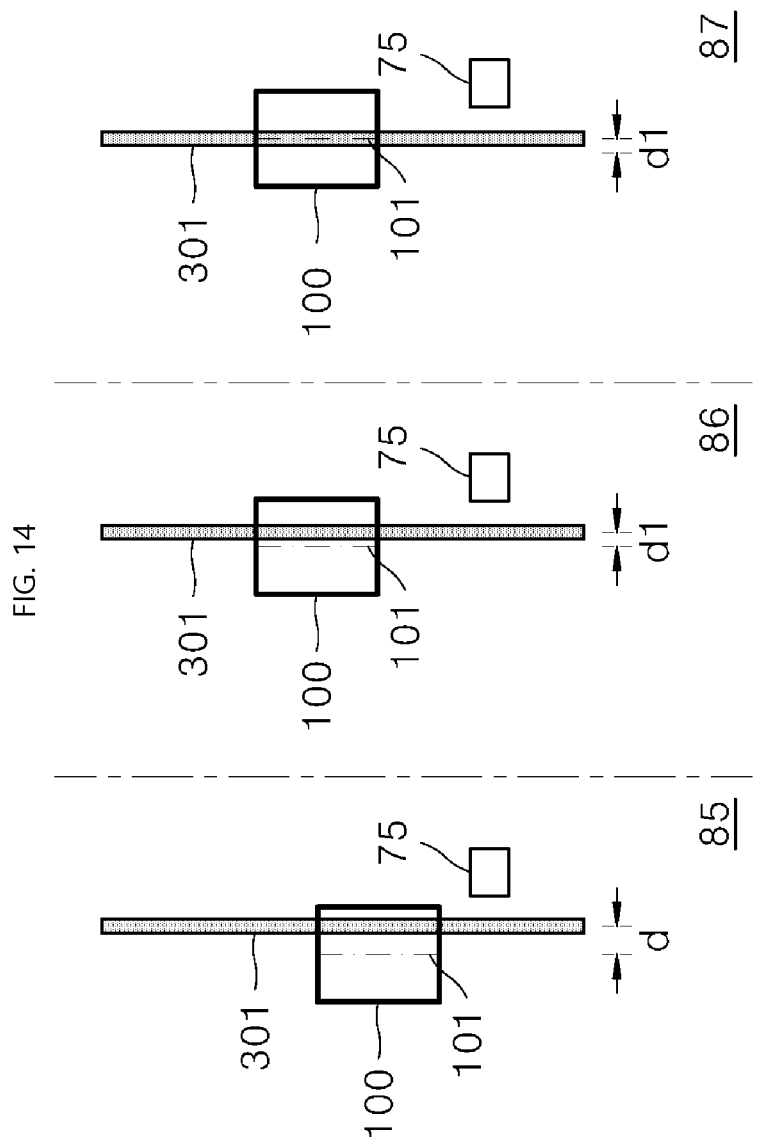

FIGS. 13 and 14 illustrate routines in which a cart-robot performs semi-autonomous traveling and marker tracking traveling according to an embodiment of the invention.

In reference numeral 81, a cart-robot 100 ascertains a line marker 301 and the cart-robot 100 moves forward such that the line marker 301 is located at the center of the cart-robot 100. The forward movement center line 101 matches the line marker 301. As in reference numeral 82, when it is assumed that an obstacle 75 is located in front of the cart-robot 100, a user having ascertained that the obstacle operates the handle assembly 120 such that the cart-robot 100 moves to left as in reference numeral 83. As a result the forward movement center line 101 does not match the line marker 301.

In this case, the cart-robot 100 temporarily operates in the semi-autonomous traveling mode. Thereafter, the cart-robot 100 ascertains that the cart-robot is parallel to the line marker 301 and is located on the left side thereof by the user's operation of the handle assembly 120, and performs marker tracking assembly again. In marker tracking traveling, the cart-robot maintains the state in which it is shifted to left as in reference numeral 84 and moves in parallel to the line marker 301.

That is, when movement of the cart-robot 100 is controlled in marker tracking traveling and a force sensor senses change of a force, the control unit 250 stops the marker tracking traveling and starts semi-autonomous traveling. When a distance or time in which the cart-robot 100 moves in parallel is equal to or greater than a predetermined reference, the control unit 250 switches the cart-robot 100 to marker tracking traveling.

That is, the cart-robot moves along a currently ascertained marker and the distance between the marker and the cart-robot is kept. That is, when the gap "d" between the forward movement center line of the cart-robot and the marker increases by operation of the handle assembly 120, the control unit 250 keeps the gap "d" in the course of marker traveling.

As in reference numeral 85 in FIG. 14, after passing by the obstacle 75, the control unit 250 ascertains that no other objects are located near the cart-robot using the obstacle sensor 220. Then, as in reference numeral 86, the gap "d1" (d1<d) between the forward movement center line of the cart-robot and the marker decreases gradually.

In reference numeral 87, the forward movement center line 101 of the cart-robot 100 matches the line marker 301. It can be seen that the gap between the forward movement center line 101 of the cart-robot 100 and the line marker 301 is less than the gap "d1" in reference numeral 86.

FIGS. 13 and 14 can be summarized as follows. The force sensor 240 senses change of a force when the control unit is moving the cart-robot 100 to correspond to the marker 301. The control unit 250 moves the cart-robot to correspond to the change of a force sensed by the force sensor 240.

Then, the control unit 250 moves the cart-robot to be parallel to the marker depending on whether the marker 301 and the moving direction of the cart-robot 100 matches.

Thereafter, as in reference numerals 85 to 87 in FIG. 14, when the control unit 250 moves the cart-robot 100 to be parallel to the marker 301 and the obstacle sensor 220 does not senses an obstacle, the control unit 250 calculates the moving direction of the cart-robot 100 such that the forward movement center line 101 of the cart-robot 100 matches the marker 301, and moves the cart-robot 100.

On the other hand, when a cart-robot 100 perform SLAM, the sensors can acquire and store information in an area in which position estimation accuracy is high or low. The stored information is learned using an artificial intelligence module and information acquired in the area in which position estimation accuracy is low or high can be repeatedly reflected in a pose graph.

For this purpose, an artificial intelligence unit of the control unit 250, which is a kind of learning processor, can process the cumulatively stored position information, information acquired by the sensors, and numerical values for the position estimation accuracy and update the pose graph.

Artificial intelligence is a field of studying artificial intelligence or methodology of implementing artificial intelligence, and machine learning is a field of defining various problems which are handled in the field of artificial intelligence and studying methodology of solving the problems. Machine learning is also defined as an algorithm for enhancing performance of a certain operation through steady experiences thereof.

An artificial neural network (ANN) is a model which is used in machine learning and may refer to all models having problem solubility which include neurons (nodes) forming a network by coupling to synapses. An artificial neural network is defined by a connection pattern between neurons of different layers, a learning process of updating model parameters, and an activation function of generating an output value.

An artificial neural network selectively includes an input layer, an output layer, and one or more hidden layers. Each layer includes one or more neurons, and an artificial neural network includes synapses connecting neurons. In an artificial neural network, each neuron outputs input signals which are input from synapses, a weighting value, and a function value of an activation function with respect to deflection.

A model parameter refers to a parameter which is determined by learning and includes a weighting value for connection by synapses and deflection of neurons. A hyper-parameter refers to a parameter which is to be set before learning in a machine learning algorithm and includes a learning rate, a repetition number, a minimum arrangement size, and an initialization function.

The purpose of learning of an artificial neural network is to determine model parameters that minimize a loss function. A loss function can be used as an indicator for determining optimal model parameters in the course of learning an artificial neural network.

Machine learning can be classified into supervised learning, unsupervised learning, and reinforcement learning depending on learning types.

Supervised learning refers to a learning method of causing an artificial neural network to learn in a state in which a label is given to learning data, where a label refers to a correct answer (or a resultant value) which is to be inferred by the artificial neural network when learning data is input to the artificial neural network. Unsupervised learning refers to a learning method of causing an artificial neural network to learn in a state in which a label is not given to learning data. Reinforcement learning, refers to a learning method of causing an agent which is defined in a certain environment to learn selection of an action or an action sequence of maximizing cumulative compensation in each state.

Machine learning which is implemented by a deep neural network (DNN) including a plurality of hidden layers is also referred to as deep learning, and deep learning is a part of machine learning. In the following description, machine learning includes deep learning.

In a robot 100, the artificial intelligence unit which has described above with reference to FIG. 2 performs an artificial intelligence function.

In this case, the communication unit 280 of the robot 100 can transmit and receive data to and from a robot that provides another AI function or external devices such as an AI server 700 which will be described later with reference to FIG. 13 using wired or wireless communication technology. For example, the communication unit 280 can transmit and receive sensor information, a user input, a learning model, a control signal, and the like to and from external devices.

Examples of communication technology which is used by the communication unit 280 include global system for mobile communication (GSM), code-division multi access (CDMA), long-term evolution (LTE). 5G, wireless LAN (WLAN), wireless-fidelity (Wi-Fi), Bluetooth™, radio frequency identification (RFID), infrared data association (IrDA), ZigBee, and near-field communication (NFC).

The interface unit 230 acquires various types of data.

The interface unit 230 includes a camera for receiving an image signal, a microphone for receiving an audio signal, and a user input unit for receiving information from a user. Here, information acquired by the obstacle sensor 220, the camera sensor 260, or the microphone is referred to as sensing data or sensor information.

The interface unit 230, various sensors 220 and 260, and a wheel encoder of the movement unit 190 can acquire learning data for model learning, input data which is to be used for acquiring an output using a learning model. These elements may acquire raw input data. In this case, the control unit 250 or the artificial intelligence unit extracts input features as a pre-process for input data.

The artificial intelligence unit causes a model constituted by an artificial neural network to learn using learning data.

Here, a learned artificial neural network is referred to as a learning model. A learning model can be used to infer a resultant value with respect to new input data instead of learning data, and the inferred value can be used as a basis for determination which is required for a robot 100 to perform a certain operation.

Here, the artificial intelligence unit can perform AI processing along with the learning processor 740 of the AI server 700.

The artificial intelligence unit includes a memory which is incorporated into the robot 100 or implemented therein. Alternatively, the artificial intelligence unit may be implemented using an independent memory, an external memory coupled to the robot 100, or a memory which is held in an external device.

The robot 100 acquires at least one of internal information of the robot 100, surrounding environmental information of the robot 100, and user information using various sensors.

Here, examples of the sensors included in the robot 100 include a proximity sensor, an illuminance sensor, an acceleration sensor, a magnetic sensor, a gyro sensor, an inertia sensor, an RGB sensor, an IR sensor, a fingerprint recognition sensor, an ultrasonic sensor, an optical sensor, a microphone, a LADAR sensor, an obstacle sensor 220, a camera sensor 260, and a radar.

The interface unit 230 generates an output associated with a visual sense, an auditory sense, or a haptic sense.

The interface unit 230 includes a display unit that outputs visual information, a speaker that outputs auditory information, and a haptic module that outputs haptic information.

A memory built in the robot 100 store data for supporting various functions of the robot 100. For example, the memory can store input data, learning data, learning models, and learning histories which are acquired by various sensors and the interface unit 230 which are built in the robot 100.

The control unit 250 can determine at least one executable operation of the robot 100 on the basis of information which is determined or generated using a data analysis algorithm or a machine learning algorithm. The control unit 250 can perform the determined operation by controlling the elements of the robot 100.

For this purpose, the control unit 250 can request retrieve, receive, or utilize data in the artificial intelligence unit or the memory, and control the elements of the robot 100 such that a predicted operation or an operation determined to be preferable out of one or more executable operations is executed.

When cooperation with an external device is required for executing the determined operation, the control unit 250 can generate a control signal for controlling the external device and transmit the generated control signal to the external device.

The control unit 250 can acquire intention information from a user input and determine requirements of the user on the basis of the acquired intention information.

The control unit 250 can acquire intention information corresponding to a user input using at least one or more of a speech-to-text (STT) engine for converting a speech input into text and a natural language process (NLP) engine for acquiring intention information in a natural language.

At least one of the STT engine and the NLP engine can be constituted by an artificial neural network in accordance with a machine learning algorithm. At least one of the S11 engine and the NLP engine may be an engine which has learned by the artificial intelligence unit, an engine which has learned by the learning process 740 of the AI server 700, or an engine which has learned by distributed processes thereof.

The control unit 250 can collect history information including operation details of the robot 100 or feedback of a user which is used for the operation and store the collected history information in the memory or the artificial intelligence unit or transmit the collected history information to an external device such as the AI server 700. The collected history information can be used to update a learning model.

The control unit 250 can control at least a part of the elements of the robot 100 in order to drive an application program stored in the memory 170. In addition, the control unit 250 can allow two or more of the elements of the robot 100 to operate in combination in order to drive an application program.

Alternatively, an independent artificial intelligence server (an AI server) communicating with the robot 100 may be provided and process information which is provided by the robot 100.

Figure 15:
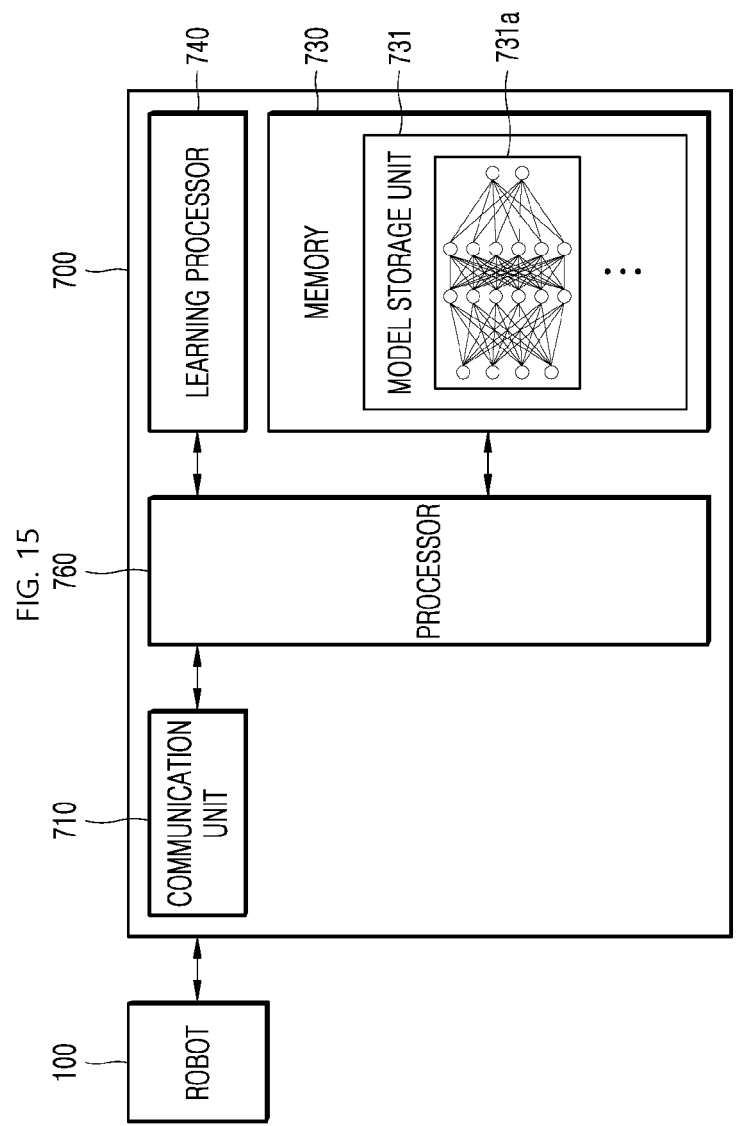
FIG. 15 is a diagram illustrating a configuration of an AI server according to an embodiment of the invention.

FIG. 15 illustrates a configuration of an AI server according to an embodiment of the invention.

An artificial intelligence server, that is, an AI server 700, refers to a device that causes an artificial neural network to learn using a machine learning algorithm or uses a learned artificial neural network. Here, the AI server 700 may include a plurality of servers and perform distributed processes and may be defined as a 5G network. Here, the AI server 700 is provided as a part of an AI device 100 and perform at least a part of AI processing together.

The AI server 700 includes a communication unit 710, a memory 730, a learning processor 740, and a processor 760.

The communication unit 710 transmit and receive data to and from an external device such as the robot 100.

The memory 730 includes a model storage unit 731. The model storage unit 731 stores a model which is learning or learned (or an artificial neural network 231a) via the learning processor 740.

The learning processor 740 causes the artificial neural network 231a to learn using learning data. A learning model may be used in a state in which it is mounted in the AI server 700 of an artificial neural network or may be used in a state in which it is mounted in an external device such as the robot 100.

A learning model may be implemented in hardware, ill software, or in a combination of hardware and software. When a part or the whole of a learning model is implemented in software, one or more instructions constituting the learning model can be stored in the memory 730.

The processor 760 infers a resultant value for new input data using a learning model and a response or a control command based on the inferred value.

When all elements of the embodiments of the invention are described to be combined into one element or to operate in combination, the invention is not limited to the embodiments and all the elements may be selectively combined to operate within the scope of the invention. All the elements may be embodied can be embodied as independent hardware pieces, respectively, or some or all of the elements may be selectively combined and may be embodied as a computer program including a program module that performs some or all functions combined into one or more hardware pieces. Codes or code segments of the computer program can be easily inferred by those skilled in the art. The computer program can be stored in a computer-readable recording medium and can be read and executed by a computer, whereby the embodiments of the invention can be realized.

Examples of a storage medium having stored the computer program include storage mediums such as a magnetic recording medium, an optical recording medium, and a semiconductor recording medium. The computer program for realizing the embodiments of the invention includes a program module which is transmitted via an external device in real time.

While embodiments of the invention have been described above, various changes or modifications can be made thereon by those skilled in the art. Accordingly, it should be understood that such changes and modifications belong to the scope of the invention without departing from the scope of the invention.

The invention claimed is:

1. A robot that lines up and moves based on space recognition, the robot comprising:
   a movement unit that allows the robot to move;
   an obstacle sensor that senses an obstacle near the robot;
   a camera sensor that images a marker disposed on a traveling floor of the robot or a side of the traveling floor;
   a force sensor that senses change of a force which is applied to a handle assembly of the robot; and
   a control unit that analyzes an image captured by the camera sensor, calculates a moving direction or a moving speed of the robot based on the marker, and controls the movement unit,
   wherein, when the force sensor senses the change of the force while the control unit moves the robot based on the marker, the control unit moves the robot based on the change of the force sensed by the force sensor and then moves the robot in parallel to the marker depending on whether the marker and the moving direction of the robot match each other.

2. The robot according to claim 1, wherein the marker includes one or more light sources that emit light, and
   wherein the control unit calculates the moving speed or the moving direction in a space in which the marker is disposed using one of a color, a shape, and a flickering pattern of the marker.

3. The robot according to claim 2, wherein the marker includes a first marker and a second marker, and
   wherein the control unit distinguishes the first marker and the second marker in the image, calculates the moving direction of the robot based on the first marker, and calculates the moving speed of the robot based on the second marker.

4. The robot according to claim 3, wherein, when the control unit increases the moving speed of the robot based on the second marker and then the obstacle sensor senses an obstacle in the moving direction of the robot, the control unit stops the robot until a distance from the obstacle increases.

5. The robot according to claim 2, wherein the marker is a line marker, and
   wherein the control unit increases or decreases the moving speed in proportion to or in inverse proportion to a width of the line marker.

6. The robot according to claim 5, wherein the marker is disposed in an entry area and an exit area of a moving walk,
   wherein the control unit moves the robot at a first speed when the line marker appears first in a first image captured by the camera sensor,
   wherein the control unit stops the robot when the line marker disappears in a second image captured by the camera sensor, and
   wherein the control unit moves the robot at a speed higher than the first speed when the line marker appears in a third image captured by the camera sensor.

7. The robot according to claim 1, further comprising a communication unit that transmits a result of movement of the robot to the marker.

8. The robot according to claim 1, wherein, when the robot moves in parallel to the marker and the obstacle sensor does not sense an obstacle, the control unit calculates the moving direction of the robot so that the marker and a forward-movement centerline match each other.

9. The robot according to claim 1, wherein the marker comprises:
   a light source that emits light;
   a communication unit that receives a control message for controlling an operation of the marker from a server or a marker control module; and
   a marker control unit that controls emission of light from the light source according to the control message.

10. The robot according to claim 9, wherein the communication unit of the marker receives a result of movement of the robot adjacent thereto.

11. The robot according to claim 9, further comprising a cart sensor that senses a result of movement of the robot,
    wherein the marker control unit controls a light color, a flickering pattern, or ON/OFF of the light source according to a moving speed of a robot sensed by the cart sensor.

12. A method of moving and lining up based on space recognition, the method comprising:
    causing a movement unit of a robot to move the robot;
    causing a camera sensor to image a marker which is disposed on a traveling floor of the robot or a side of the traveling floor while moving;
    analyzing an image captured by the camera sensor and identifying the marker;
    causing a control unit of the robot to calculate a moving direction or a moving speed of the robot based on the marker; and
    causing the control unit to control the movement unit using one or more of the calculated moving direction and the calculated moving speed,
    wherein the marker includes one or more light sources that emit light,
    wherein the method further comprises causing the control unit to calculate the moving speed or the moving direction in a space in which the marker is disposed using one of a color, a shape, and a flickering pattern of the marker,
    wherein the marker is a line marker, and
    wherein the method further comprises causing the control unit to increase or decrease the moving speed in proportion to or in inverse proportion to the width of the line marker.

13. The method according to claim 12, wherein the marker includes a first marker and a second marker, and
    wherein the method further comprises:
    causing the control unit to distinguish the first marker and the second marker in the image; and
    causing the control unit to calculate the moving direction of the robot based on the first marker, and calculates the moving speed of the robot based on the second marker.

14. The method according to claim 13, further comprising:
    causing the control unit to increase the moving speed of the robot based on the second marker;

causing the obstacle sensor to sense an obstacle in the moving direction of the robot; and causing the control unit to stop the robot until a distance from the obstacle increase.

15. The method according to claim 12, wherein the marker is disposed in an entry area and an exit area of a moving walk, wherein the method further comprises:

causing the control unit to move the robot at a first speed when the line marker appears first in a first image captured by the camera sensor;

causing the control unit to stop the robot when the line marker disappears in a second image captured by the camera sensor; and causing the control unit to move the robot at a speed higher than the first speed when the line marker appears in a third image captured by the camera sensor.

16. A method of moving and lining up based on space recognition, the method comprising:

causing a movement unit of a robot to move the robot;

causing a camera sensor to image a marker which is disposed on a traveling floor of the robot or a side of the traveling floor while moving;

analyzing an image captured by the camera sensor and identifying the marker;

causing a control unit of the robot to calculate a moving direction or a moving speed of the robot based on the marker;

causing the control unit to control the movement unit using one or more of the calculated moving direction and the calculated moving speed;

causing the force sensor to sense change of a force while the control unit moves the robot based on the marker;

causing the control unit to move the robot based on the change of a force sensed by the force sensor; and causing the control unit to move the robot in parallel to the marker depending on whether the marker and the moving direction of the robot match each other.

17. The method according to claim 16, further comprising, causing when the robot moves in parallel to the marker and the obstacle sensor does not sense an obstacle, the control unit to calculate the moving direction of the robot so that the marker and a forward-movement centerline match each other.

* * * * *